(12) United States Patent
Kano et al.

(10) Patent No.: US 12,445,065 B2
(45) Date of Patent: Oct. 14, 2025

(54) SUPPORT SYSTEM AND FLEXIBLE DISPLAY DEVICE COMPRISING SUPPORT SYSTEM

(71) Applicant: SHARP KABUSHIKI KAISHA, Osaka (JP)

(72) Inventors: Shugo Kano, Sakai (JP); Ryuzo Yuki, Sakai (JP); Tomohiro Kimura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 195 days.

(21) Appl. No.: 18/276,759

(22) PCT Filed: Feb. 15, 2021

(86) PCT No.: PCT/JP2021/005549
§ 371 (c)(1),
(2) Date: Aug. 10, 2023

(87) PCT Pub. No.: WO2022/172458
PCT Pub. Date: Aug. 18, 2022

(65) Prior Publication Data
US 2024/0120852 A1    Apr. 11, 2024

(51) Int. Cl.
*H02N 1/00*    (2006.01)
*H10K 59/80*    (2023.01)

(52) U.S. Cl.
CPC ............. *H02N 1/002* (2013.01); *H10K 59/80* (2023.02)

(58) Field of Classification Search
CPC ...... H02N 1/002; H10K 59/80; H10K 77/111; H10K 2102/311; G06F 1/1652; G09F 9/301
See application file for complete search history.

(56) References Cited

U.S. PATENT DOCUMENTS

| | | | |
|---|---|---|---|
| 9,756,702 B2 * | 9/2017 | Hamel | H10D 99/00 |
| 2006/0099808 A1 | 5/2006 | Kondo | |
| 2008/0018603 A1 * | 1/2008 | Baraz | G06F 1/1666 345/168 |
| 2012/0075732 A1 | 3/2012 | Griffith et al. | |
| 2013/0083496 A1 | 4/2013 | Franklin et al. | |
| 2015/0055308 A1 * | 2/2015 | Lim | G06F 1/1652 264/480 |
| 2015/0116920 A1 | 4/2015 | Franklin et al. | |
| 2015/0179717 A1 | 6/2015 | Kawata | |
| 2016/0179253 A1 | 6/2016 | Franklin et al. | |
| 2016/0268315 A1 | 9/2016 | Kawata | |
| 2017/0139532 A1 | 5/2017 | Franklin et al. | |
| 2017/0364120 A1 | 12/2017 | Zhao et al. | |
| 2018/0260072 A1 | 9/2018 | Franklin et al. | |

(Continued)

FOREIGN PATENT DOCUMENTS

| | | |
|---|---|---|
| JP | 2004-071765 A | 3/2004 |
| JP | 2015-501461 A | 1/2015 |

(Continued)

*Primary Examiner* — Vinh T Lam
(74) *Attorney, Agent, or Firm* — ScienBiziP, P.C.

(57) ABSTRACT

A support system includes: a container that is deformable; an ER fluid sealed in the container; and a plurality of application electrodes each provided in the container, and the support system further includes a plurality of rigid bodies each firmly fixed to the container.

20 Claims, 20 Drawing Sheets

(56) References Cited

U.S. PATENT DOCUMENTS

| | | | |
|---|---|---|---|
| 2019/0234436 A1 | 8/2019 | Zhao et al. | |
| 2019/0251875 A1* | 8/2019 | Park | H10K 59/8722 |
| 2019/0278422 A1 | 9/2019 | Franklin et al. | |
| 2020/0012367 A1* | 1/2020 | Seo | G06F 1/1652 |
| 2020/0363900 A1 | 11/2020 | Franklin et al. | |
| 2021/0165455 A1* | 6/2021 | Wang | G06F 1/1637 |

FOREIGN PATENT DOCUMENTS

| | | |
|---|---|---|
| JP | 2015-143846 A | 8/2015 |
| JP | 6445167 B2 | 12/2018 |

* cited by examiner

SUPPORT SYSTEM AND FLEXIBLE DISPLAY DEVICE COMPRISING SUPPORT SYSTEM

TECHNICAL FIELD

The disclosure relates to a support system and a flexible display device including the support system.

BACKGROUND ART

Electrorheological fluids (hereinafter, referred to as ER fluids) have been variously used recently.

Patent Literatures 1 and 2 disclose a configuration where an ER fluid is used for a support system that supports a flexible display panel, so that the flexible display panel is deformable and fixable.

CITATION LIST

Patent Literatures

Patent Literature 1: Japanese Unexamined Patent Application Publication No. 2004-71765
Patent Literature 2: Japanese Patent No. 6445167

SUMMARY

Technical Problem

Unfortunately, such a conventional technique as that in Patent Literatures 1 and 2 needs to maintain the ER fluid's viscosity at a degree sufficient for fixation while the support system is fixing the flexible display panel.

The disclosure has been made in view of the above problem and aims to reduce the viscosity of an ER fluid that is necessary for a support system to fix a supported target, such as a flexible display panel.

Solution to Problem

To solve the above problem, a support system according to one aspect of the disclosure includes the following: a container being deformable; an electrorheological fluid sealed in the container; and a plurality of application electrodes each provided in the container, and the support system further includes a plurality of rigid bodies each firmly fixed to the container.

Advantageous Effect of Disclosure

The aspect of the disclosure can reduce the viscosity of an ER fluid that is necessary for a support system to fix a supported target, such as a flexible display panel.

DESCRIPTION OF EMBODIMENTS

First Embodiment

Configuration of Flexible Display Device

Figure 1:
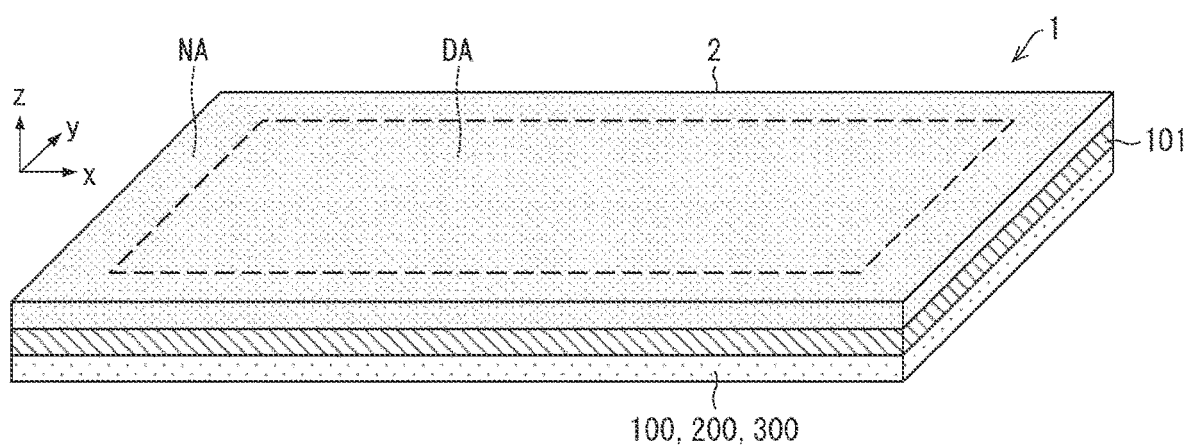
FIG. 1 is a schematic diagram illustrating the overall appearance of a flexible display device according to some embodiments of the disclosure.

FIG. 1 is a schematic diagram illustrating the overall appearance of a flexible display device 1 according to a first embodiment.

As illustrated in FIG. 1, the flexible display device 1 in the first embodiment includes a flexible display panel 2, a support system 100, and a first adhesive layer 101. The first adhesive layer 101 is provided between the flexible display panel 2 and the support system 100 and firmly fixes the flexible display panel 2 flexibly to the support system 100.

As illustrated in FIG. 1, a direction parallel with the flexible display panel 2 and support system 100 is defined as an x-direction. Further, a direction parallel with the flexible display panel 2 and support system 100, and orthogonal to the x-direction is defined as a y-direction. Further, a direction orthogonal to the flexible display panel 2 and support system 100, that is, a direction orthogonal to the x- and y-directions is defined as a z-direction. The x-, y- and z-directions of the flexible display panel 2 and the x-, y- and z-directions of the support system 100 coincide with each other.

Although not shown, the flexible display device 1 in the first embodiment may further include components, such as a casing and a power source device, optionally.

The first adhesive layer 101 as well as a second adhesive layer 102 and a third adhesive layer 103, both of which will be described later on, may be, for instance, optical clear adhesives (OCAs).

Flexible Display Panel

The term "in the same layer" hereinafter means that one layer is formed in the same process step (film formation step) as another layer, the term "under" hereinafter means that one layer is formed in a process step anterior to a process step of forming a comparative layer, and the term "over" hereinafter means that one layer is formed in a process step posterior to a process step of forming a comparative layer.

Figure 2:
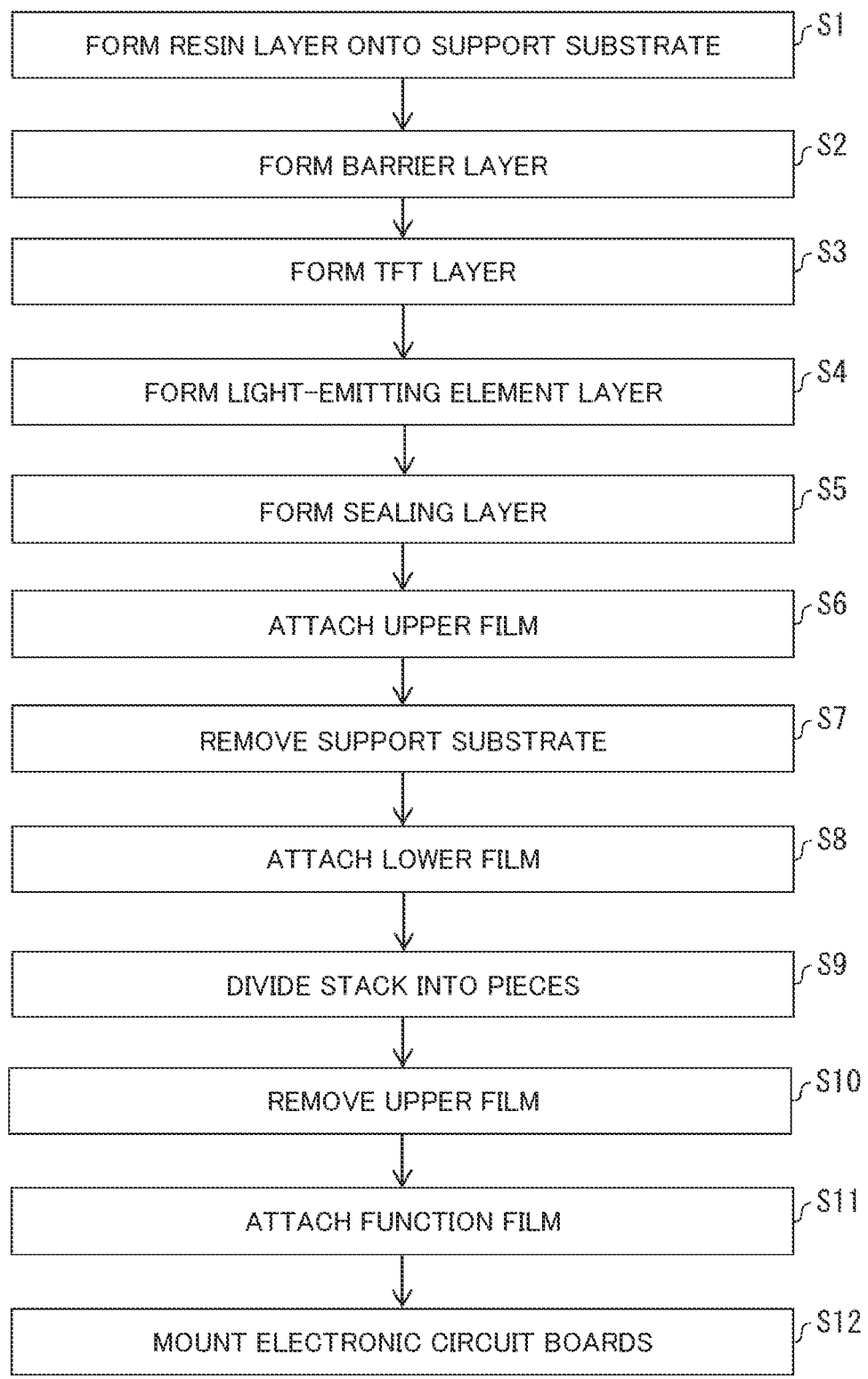
FIG. 2 is a flowchart showing an example method for manufacturing the flexible display panel according to the embodiments of the disclosure.
Figure 3:
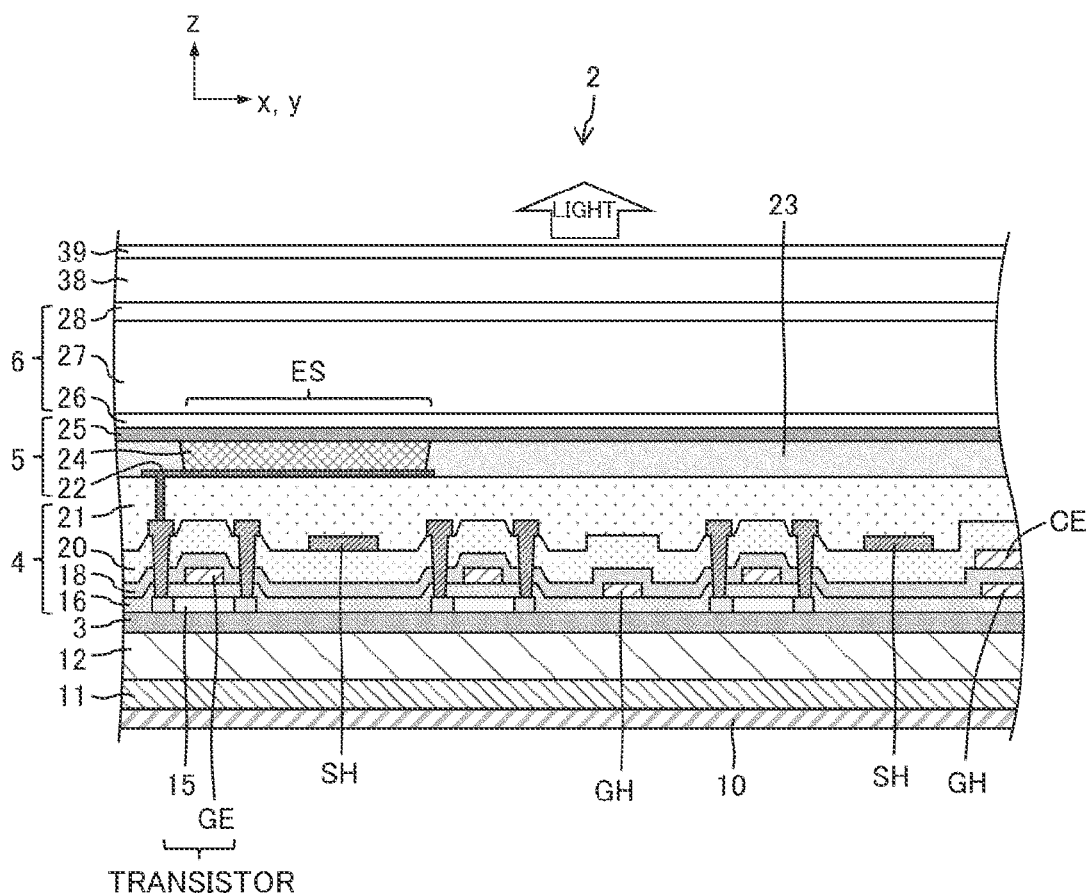
FIG. 3 is a schematic sectional view of an example configuration of the display region of the flexible display panel according to the embodiments of the disclosure.

FIG. 2 is a flowchart showing an example method for manufacturing the flexible display panel 2. FIG. 3 is a schematic sectional view of an example configuration of the display region of the flexible display panel 2.

The flexible display device 2 is manufactured through the following process steps: the first process step (Step S1) is, as illustrated in FIG. 2 and FIG. 3, forming a resin layer 12 onto a light-transparent support substrate (e.g., mother glass). The next (Step S2) is forming a barrier layer 3. The next (Step S3) is forming a thin-film transistor layer 4 (TFT layer). The next (Step S4) is forming a top-emission light-emitting element layer 5. The next (Step S5) is forming a sealing layer 6. The next (Step S6) is attaching an upper film onto the sealing layer 6 via an adhesive layer.

The next (Step S7) is removing the support substrate from the resin layer 12 through laser light irradiation or other methods. The next (Step S8) is attaching a lower film 10 onto the lower surface of the resin layer 12 via an adhesive layer 11. The next (Step S9) is dividing a stack of the lower film 10, adhesive layer 11, resin layer 12, barrier layer 3, thin-film transistor layer 4, light-emitting element layer 5 and sealing layer 6 together with the upper film into a plurality of pieces. The next (Step S10) is removing the upper film from the obtained pieces, followed by a process step (Step S11) of attaching the function film 39 onto the pieces' sealing layers 6 via an adhesive layer 38. The next (Step S12) is mounting an electronic circuit board (e.g., an IC chip and an FPC) onto a part (terminal section) of a frame region (a non-display region; see FIG. 1) NA surrounding the display region, DA, (see FIG. 1) with multiple subpixels formed therein. It is noted that Steps S1 through S12 are performed by an apparatus (including a film formation apparatus that performs Steps S1 through S5) that manufactures a display device.

The lower film 10 is a base material film for the display device 2 and may contain, for instance, an organic resin material. The adhesive layer 11 is a layer that bonds the lower film 10 and the resin layer 12 together and may be formed by the use of a conventionally publicly known adhesive. The resin layer 12 may contain polyimide as its material.

The barrier layer 3 is a layer that avoids foreign substances, including water and oxygen, from permeating the thin-film transistor layer 4 and light-emitting element layer 5 when the flexible display panel 2 is used. The barrier layer 3 can be composed of, for instance, a silicon oxide film, a silicon nitride film or a silicon oxide nitride film, all of which are formed through CVD, or these films can be composed of a laminate of these films.

The thin-film transistor layer 4 includes the following: a semiconductor film 15 over the barrier layer 3; a first inorganic insulating film 16 (gate insulating film) over the semiconductor film 15; a gate electrode GE and a gate line GH over the first inorganic insulating film 16; a second inorganic insulating film 18 over the gate electrode GE and gate line GH; a capacitive electrode CE over the second inorganic insulating film 18; a third inorganic insulating film 20 over the capacitive electrode CE; a source line SH over the third inorganic insulating film 20; and a flattening film 21 over the source line SH. Thin-film transistors (TFTs) are composed so as to include the semiconductor film 15, the first inorganic insulating film 16 and the gate electrode GE.

The semiconductor film 15 is composed of, for instance, low-temperature polysilicon (LTPS) or an oxide semiconductor. It is noted that although the TFTs, with the semiconductor film 15 serving as their channels are of top gate structure in FIG. 3, they may be of bottom gate structure (for instance, when the TFTs' channels are oxide semiconductors).

The gate electrode GE, the gate line GH, the capacitive electrode CE or the source line SH may contain, for instance, at least one of aluminum (Al), tungsten (W), molybdenum (Mo), tantalum (Ta), chromium (Cr), titanium (Ti) and copper (Cu). That is, the gate electrode GE, the gate line GH, the capacitive electrode CE or the source line SH is composed of a monolayer film of the foregoing metals or a laminate film of the foregoing metals.

The first inorganic insulating film 16, the second inorganic insulating film 18 and the third inorganic insulating film 20 can be composed of, for instance, a silicon oxide (SiOx) film or a silicon nitride (SiNx) film, both of which are formed through CVD, or these films can be composed of a laminate of these films. The flattening film 21 can be composed of an organic photosensitive material that can be applied, such as polyimide or acrylic.

The light-emitting element layer 5 includes the following: an anode 22 (a positive electrode, so-called a pixel electrode) 22 over the flattening film 21; an insulating edge cover 23 covering the edge of the anode 22; an active layer 24, which is an electroluminescence (EL) layer, over the edge cover 23; and a cathode 25 (negative electrode, so-called a common electrode) over the active layer 24.

Each subpixel includes the anode 22 and active layer 24 in the form of an island, and the cathode 25, which form a light-emitting element ES (electric-field light-emitting element), which is a quantum-dot light-emitting diode (QLED), in the light-emitting-element layer 5; in addition, a subpixel circuit that controls the light-emitting element ES is formed in the thin-film transistor layer 4.

The sealing layer 6 is transparent to light and includes an inorganic sealing film 26 covering the cathode 25, an organic buffer film 27 over the inorganic sealing film 26, and an inorganic sealing film 28 over the organic buffer film 27. The sealing layer 6, covering the light-emitting element layer 5, avoids foreign substances, including water and oxygen, from permeating the light-emitting element layer 5. The inorganic sealing films 26 and 28 can be composed of, for instance, a silicon oxide film, a silicon nitride film or a silicon oxide nitride film, all of which are formed through CVD, or these films can be composed of a laminate of these films. The organic buffer film 27 can be composed of an organic photosensitive material that can be applied, such as polyimide or acrylic.

Configuration of Support System

Figure 4:
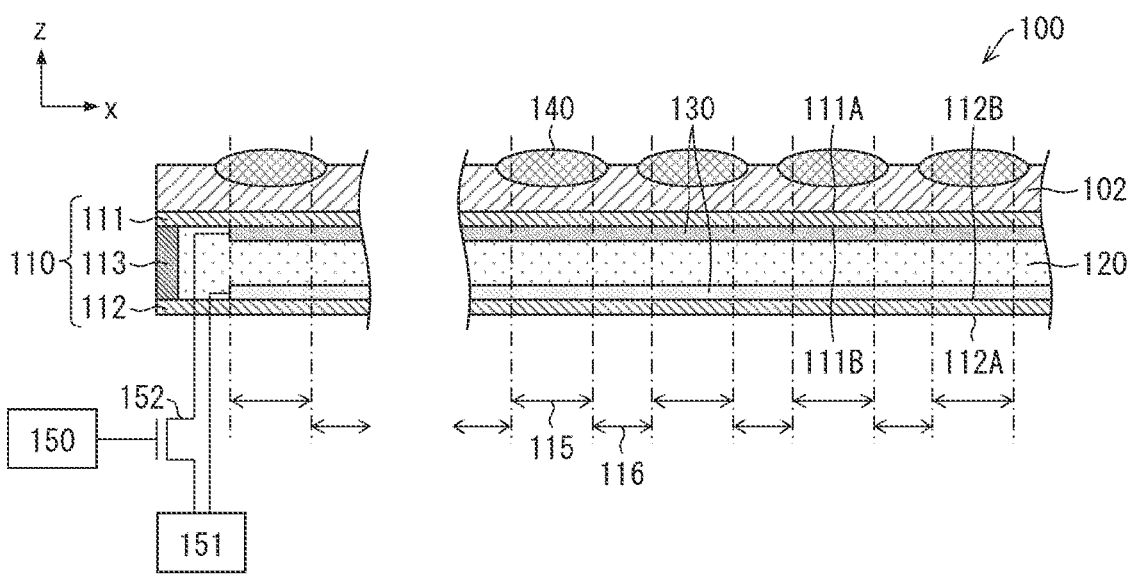
FIG. 4 is a sectional view of an example schematic configuration of a support system according to one embodiment of the disclosure.
Figure 5:
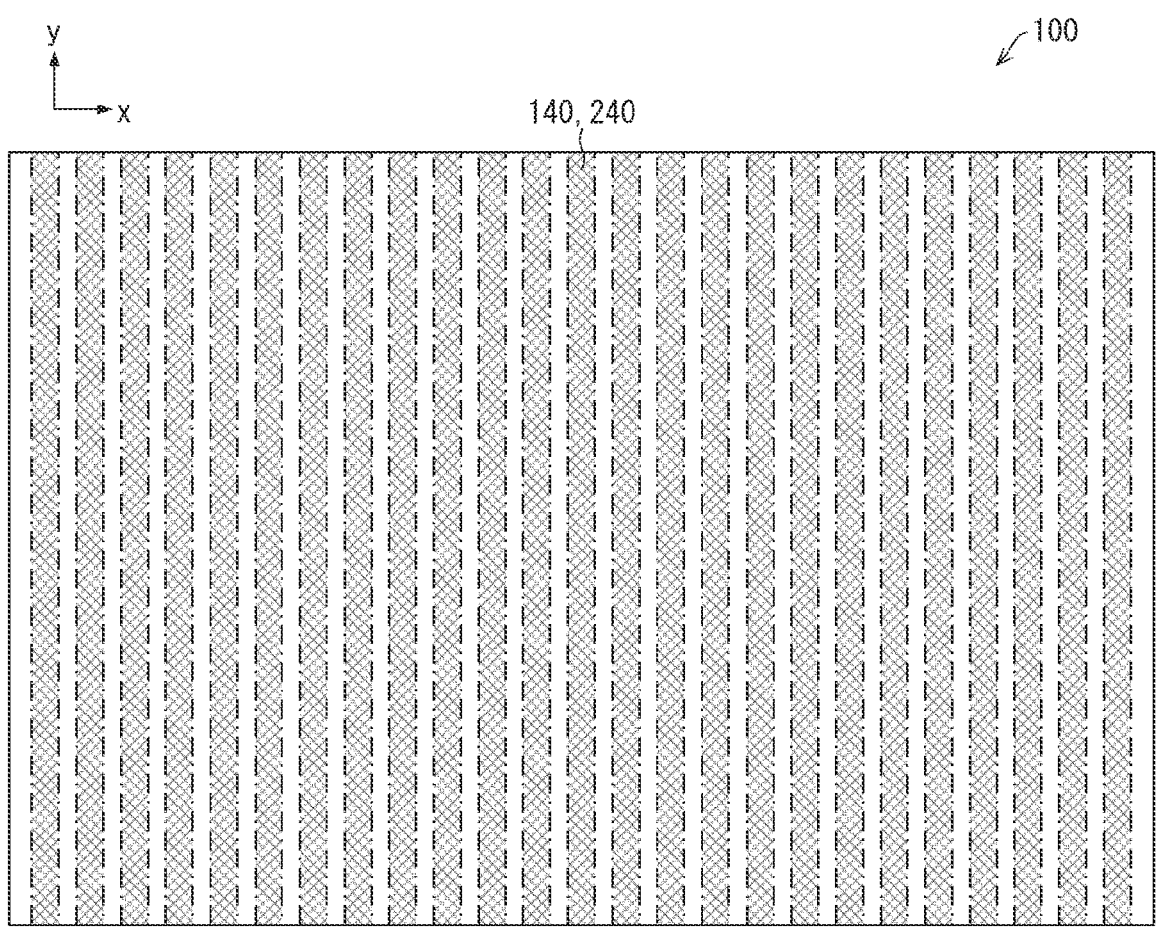
FIG. 5 is a plan view of an example arrangement of a plurality of rigid bodies illustrated in FIG. 4.

The following describes the configuration of the support system 100 according to the first embodiment with reference to FIG. 4 and FIG. 5.

FIG. 4 is a sectional view of an example schematic configuration of the support system 100 according to the first embodiment. FIG. 5 is a plan view of an example arrangement of a plurality of rigid bodies 140 illustrated in FIG. 4.

As illustrated in FIG. 4, the support system 100 according to the first embodiment includes the following: a container 110 that is deformable; an electrorheological fluid (ER fluid) 120 sealed in the container 110; and a plurality of application electrodes 130 each provided in the container. The support system 100 further includes a plurality of rigid bodies 140 each firmly fixed to the container 110. The support system 100 further includes a control circuit 150 that softens or hardens the ER fluid 120 by controlling current and/or voltage that is supplied to each of the plurality of application electrodes 130.

The container 110 contains a first flexible substrate 111 and a second flexible substrate 112 facing the first flexible substrate 111. The container 110 further contains a sealant 113 joining the first flexible substrate 111 to the second flexible substrate 112.

One of the surfaces of the first flexible substrate 111 facing the outside of the container 110 is defined as an outer surface 111A, and the other surface facing the inside of the container 110 is defined as an inner surface 111B. Likewise, one of the surfaces of the second flexible substrate 112 facing the outside of the container 110 is defined as an outer surface 112A, and the other surface facing the inside of the container 110 is defined as an inner surface 112B. The outer surfaces 111A and 112A are opposite to each other, and the inner surfaces 111B and 112B are opposite to each other.

For simple description, the Description describes an example configuration where the first flexible substrate 111 is located closer to the flexible display panel 2, and where the second flexible substrate 112 is located farther from the flexible display panel 2. It is noted that this configuration is non-limiting; an example configuration where the first flexible substrate 111 is located farther from the flexible display panel 2, and where the second flexible substrate 112 is located closer to from the flexible display panel 2 is also included in the scope of the disclosure.

The ER fluid 120 is sealed between the first flexible substrate 111 and the second flexible substrate 112.

The ER fluid 120 is a fluid that prominently changes the apparent viscosity of the fluid, sandwiched between electrodes, upon voltage application between the electrodes. Typically, the ER fluid 120 is a fluid with fine particles (dispersed phase) that have a diameter of about 0.1 to 100 μm and that exhibit a polarization characteristic, being dispersed within an electrical insulating fluid (dispersion medium) and is a fluid that causes a phenomenon where its apparent viscosity increases along with increase in applied voltage. Examples of an electrical insulating fluid include silicone oil, kerosene, mineral oil, and polychlorinated biphenyl. Examples of fine particles that exhibit a polarization characteristic include aluminosilicate, polyaniline, polypyrrole, and fullerene.

The apparent viscosity will be hereinafter referred merely to as viscosity.

The plurality of application electrodes 130 can be disposed variously. Suitable arrangements of the application electrodes 130 will be described later on.

The application electrodes 130 are preferably formed of a metal material, including ITO and Ag. The application electrodes 130 preferably have a thickness of 0.5 to 5 μm inclusive. Among the application electrodes 130, an anode and a cathode facing or adjacent to each other with the ER fluid 120 interposed therebetween are preferably distant from each other by 1 to 50 μm inclusive.

Each of the plurality of rigid bodies 140 is firmly fixed to the outer surface 111A of the first flexible substrate 111 (one outer surface of the container) flexibly via the second adhesive layer 102. Accordingly, the deformation of the container 110 is limited. To be specific, sections 115, corresponding to the rigid bodies 140, of the container 110 are difficult to deform even when the ER fluid 120 is softened. These difficult-to-deform sections 115 will be hereafter referred to as rigid-body sections. On the other hand, sections 116, not corresponding to the rigid bodies 140, of the container 110, that is, the sections 116, corresponding to spaces between the rigid bodies 140, are easily deformable when the ER fluid 120 is softened. These deformable sections 116 will be hereafter referred to as flexible sections.

The plurality of rigid bodies 140 in the first embodiment are each firmly fixed to the outer surface 111A via the second adhesive layer 102. On the other hand, a plurality of rigid bodies 240 in a second embodiment, which will be described later on, are each firmly fixed to the inner surface 111B and/or the inner surface 112B. Hence, the configuration according to the first embodiment is easier to manufacture than the configuration according to the second embodiment, which will be described later on.

The plurality of rigid bodies 140 take any sectional shape; for instance, they may be in the form of an ellipse, a trapezoid or mutually different shapes. The plurality of rigid bodies 140 may be formed of an insulating material, such as resin, or may be formed of a conductive material, such as metal.

The plurality of rigid bodies 140 take any arrangement pattern; for instance, they may be disposed so as to overlap each other in plan view from their z-axis direction. The plurality of rigid bodies 140 are preferably disposed so as not to overlap each other in plan view. This is because that there are flexible sections between the rigid-body sections, and that the entire container 110 is easily deformable when the ER fluid 120 is softened.

By way of example, the plurality of rigid bodies 140 are preferably disposed as illustrated in FIG. 5. In the example arrangement illustrated in FIG. 5, each rigid body 140 extends in the y-axis direction, and the plurality of rigid bodies align with each other in the x-axis direction, and the plurality of rigid bodies 140 are spaced from each other at regular intervals. For simple description, the Description describes an instance where the rigid bodies 140 are disposed as illustrated in FIG. 5.

The control circuit 150 controls current and/or voltage that is supplied to the application electrodes 130 by a power source circuit 151, in such a manner that the ER fluid 120 softened has a viscosity at which the container 110 (i.e., the flexible display device 1) is deformable. The control circuit 150 also controls current and/or voltage that is supplied to the application electrodes 130, in such a manner that the ER fluid 120 hardened has a viscosity at which the container 110 (i.e., the flexible display device 1) is fixable. The voltage difference between one of the application electrodes 130 that is adjacent to the first flexible substrate when the ER fluid 120 becomes hardened, and the other application electrode 130 that is adjacent to the second flexible substrate when the ER fluid 120 becomes hardened preferably stands at, for instance, 5 to 15 V inclusive.

The control circuit 150 may be provided on an electronic circuit board mounted on part of the frame region NA (see FIG. 1) in the flexible display panel 2. Other than the forgoing, the control circuit 150 may be provided in the container 110 or may be provided on an electronic circuit board mounted on part of the frame region in the container 110.

Method for Manufacturing Support System

The following describes a method for manufacturing the support system 100 according to the first embodiment with reference to FIG. 6 through FIG. 9.

Figure 6:
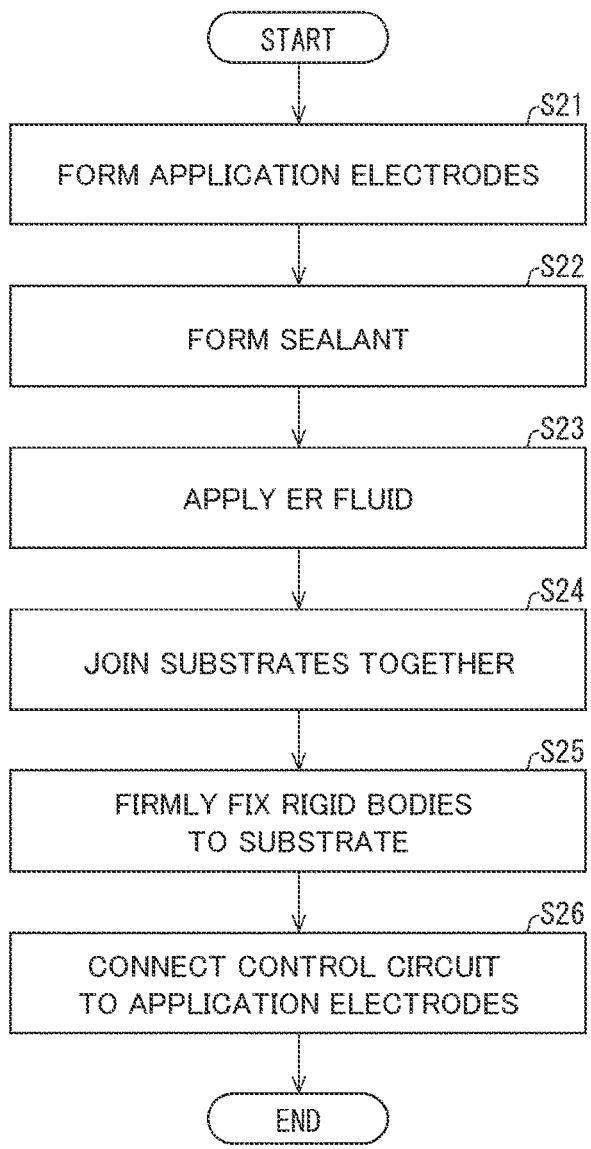
FIG. 6 is a flowchart schematically showing an example method for manufacturing the support system illustrated in FIG. 4.
Figure 7:
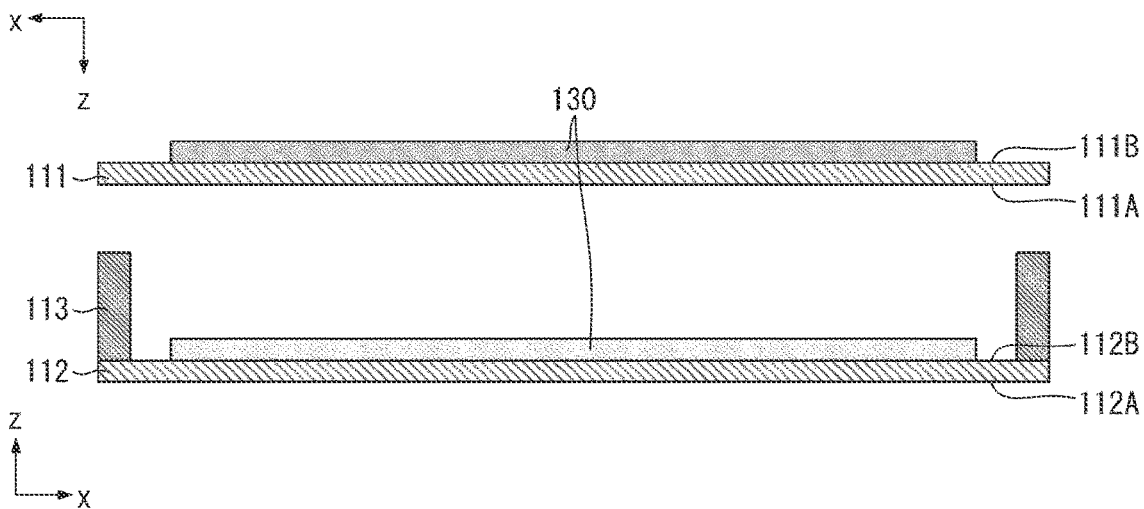
FIG. 7 schematically illustrates, in sectional view, an example process step for manufacturing the support system, 100, illustrated in FIG. 4.
Figure 8:
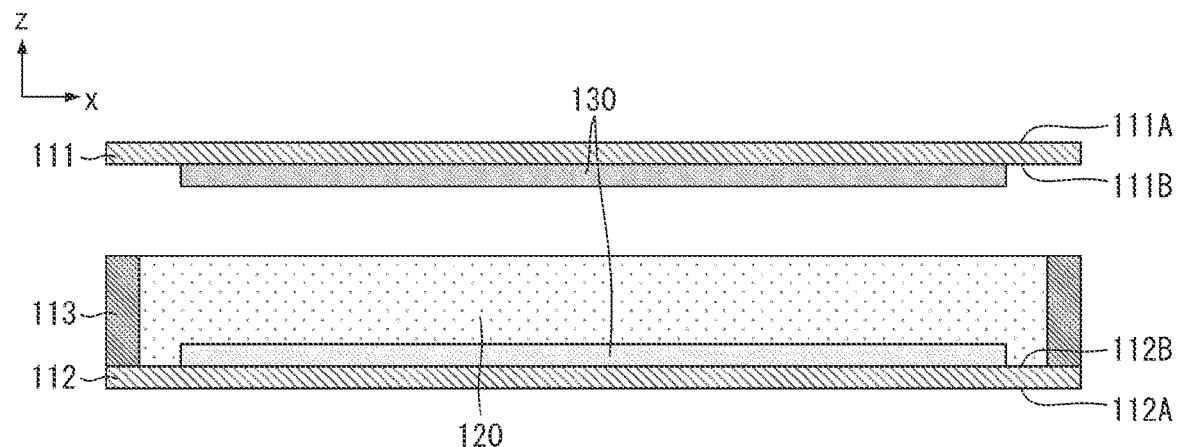
FIG. 8 schematically illustrates, in sectional view, an example process step for manufacturing the support system 100 illustrated in FIG. 4.
Figure 9:
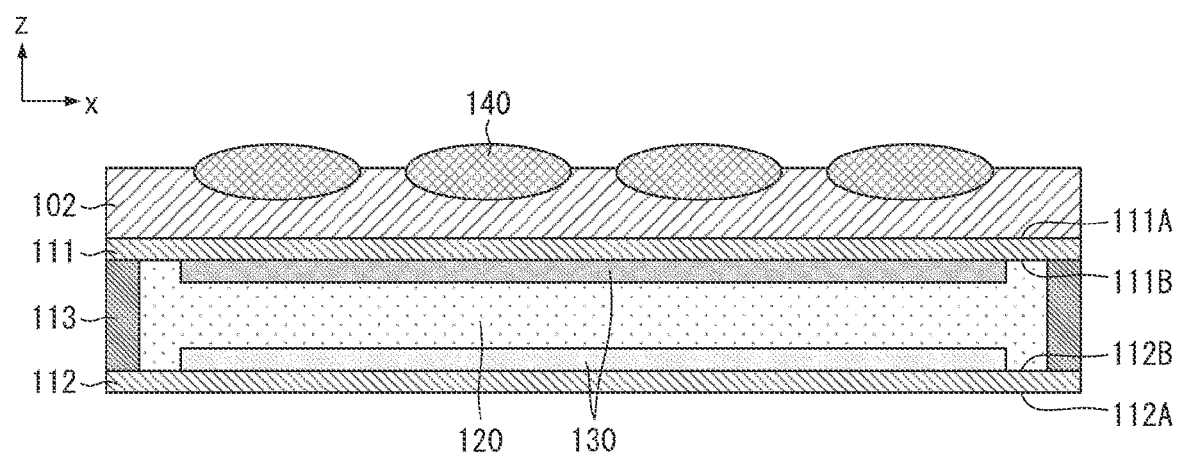
FIG. 9 schematically illustrates, in sectional view, an example process step for manufacturing the support system 100 illustrated in FIG. 4.

FIG. 6 is a flowchart schematically showing an example method for manufacturing the support system 100 illustrated in FIG. 4. FIG. 7 to FIG. 9 each schematically illustrate, in sectional view, an example process step for manufacturing the support system 100 illustrated in FIG. 4.

The first process step is preparing the first flexible substrate 111 and the second flexible substrate 112, and placing them in such a manner that their inner surfaces 111B and 112B are pointed upward. The next (Step S21) is, as shown in FIG. 6, forming the application electrodes 130 and wires (not shown) appropriately onto the inner surfaces 111B and 112B. The next (Step S22) is, as shown in FIG. 6 and FIG. 7, selecting either one of the first flexible substrate 111 and second flexible substrate 112, and forming the sealant 113 on the perimeter of the selected flexible substrate.

The next (Step S23) is, as shown in FIG. 6 and FIG. 8, applying the ER fluid 120 onto the inner surface of the selected flexible substrate so as to fill the inner side of the sealant 113 with the ER fluid 120. The next (Step S24) is turning the non-selected flexible substrate upside down so that its inner surface points downward, and joining the non-selected flexible substrate to the selected flexible substrate with the sealant 113.

The next (Step S25) is, as shown in FIG. 6 and FIG. 9, firmly fixing the plurality of rigid bodies 140 onto the outer surface 111A of the first flexible substrate 111 with the second adhesive layer 102. The next (Step S26) is, as shown in FIG. 6, electrically connecting the control circuit 150 provided on the electronic circuit board to the application electrodes 130 provided on the first flexible substrate 111 and second flexible substrate 112.

Deformation and Fixation of Flexible Display Device

Figure 10:
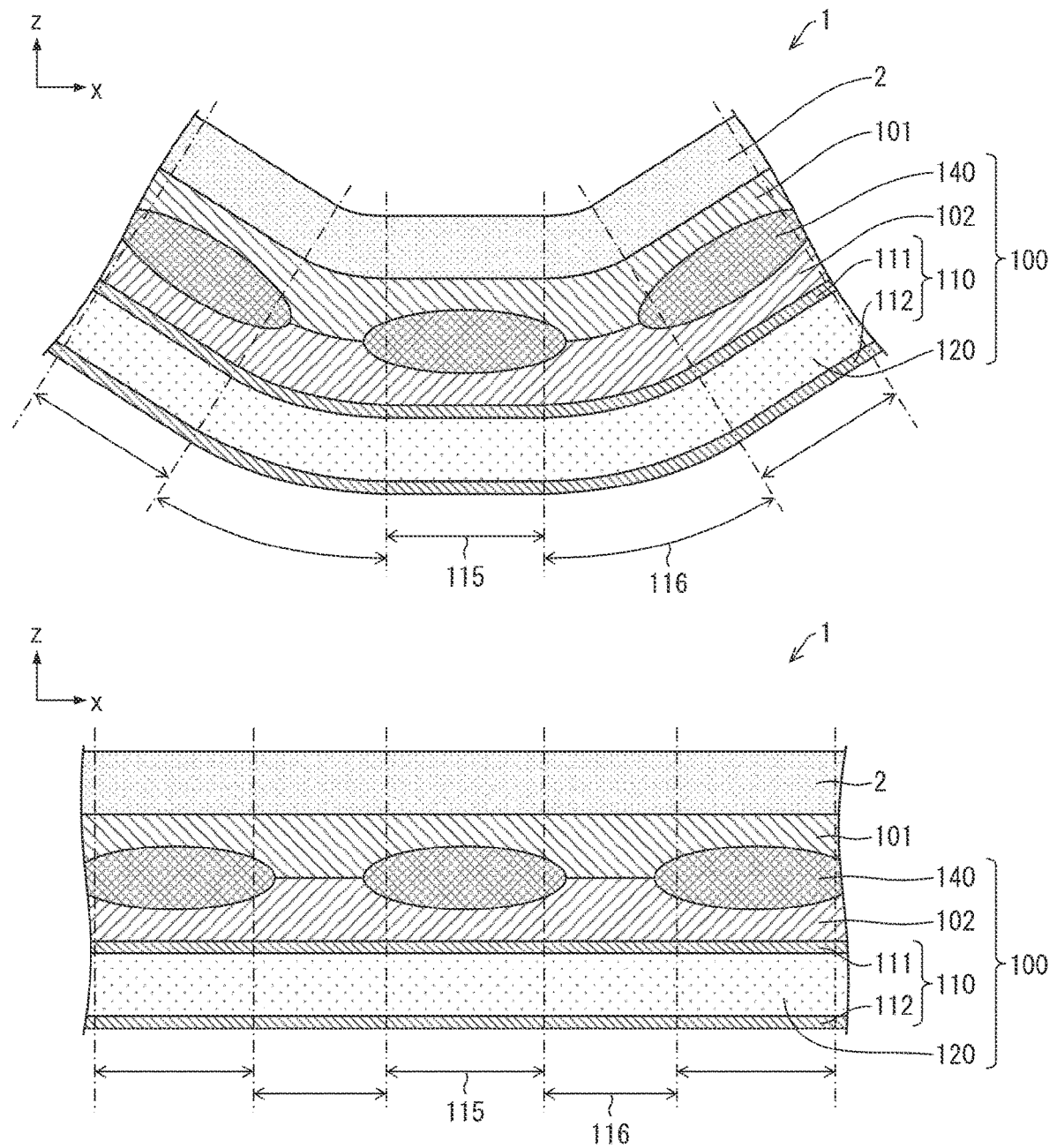
FIG. 10 is a partial sectional view of the flexible display device including the support system illustrated in FIG. 4, being curved about its curve axis, which is a y-axis direction, and being flat.
Figure 11:
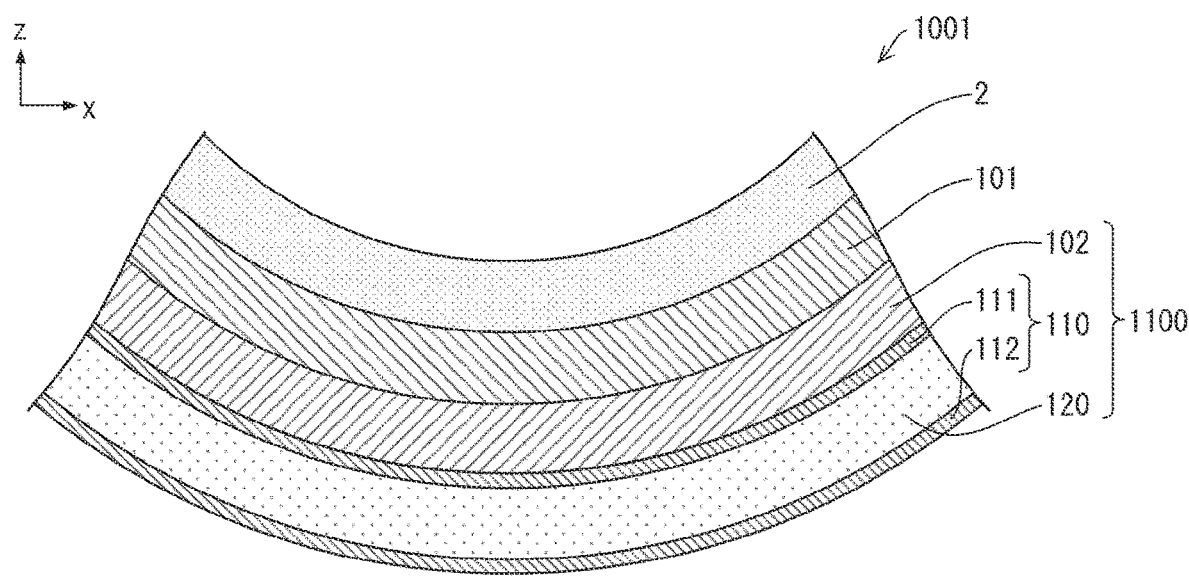
FIG. 11 is a partial sectional view of a flexible display device including a support system in a comparative example, being curved about its curve axis, which is the y-axis direction, and being flat.
Figure 11:
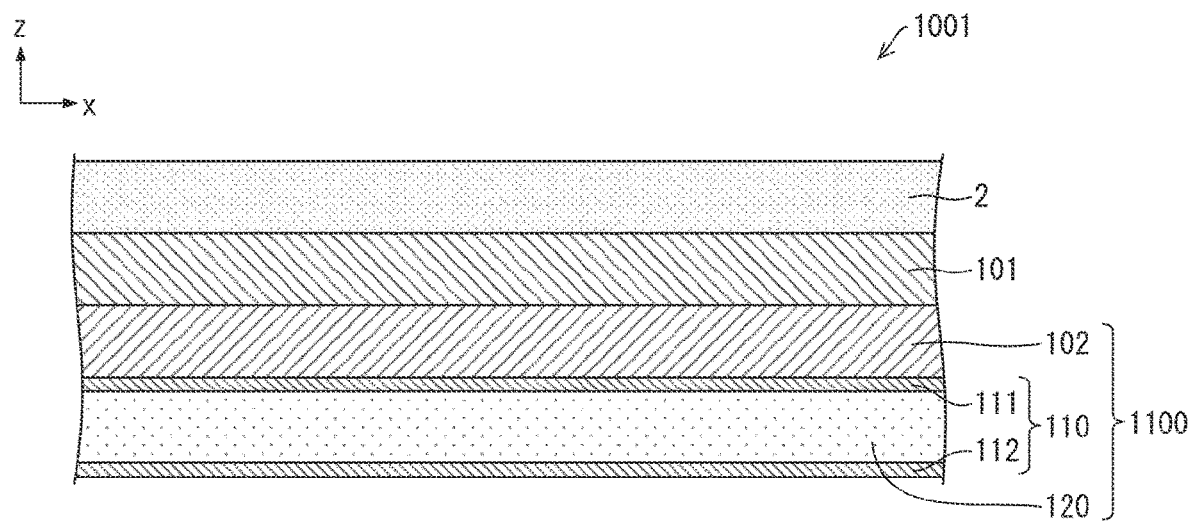
Figure 12:
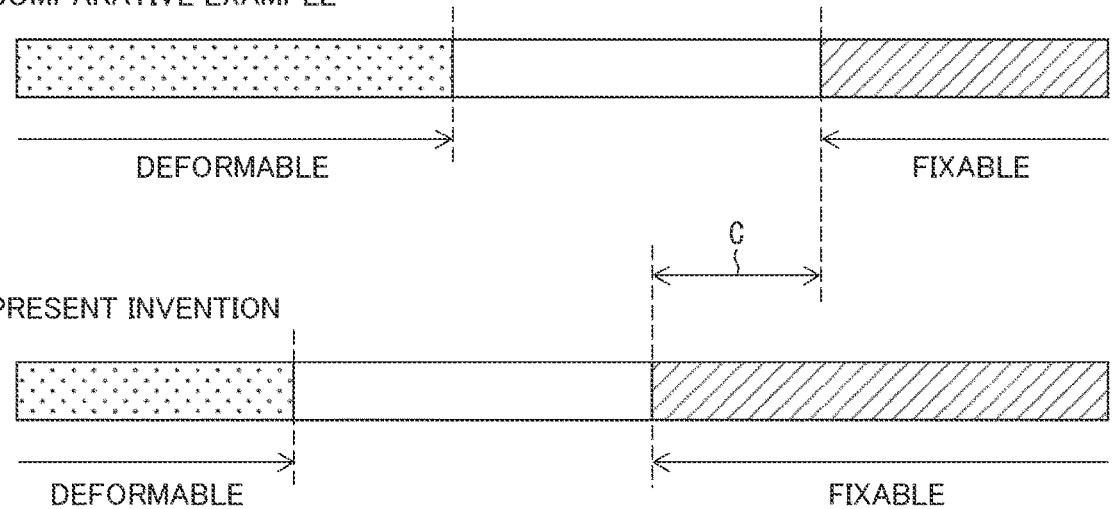
FIG. 12 schematically illustrates viscosity ranges within which the flexible display device according to the disclosure illustrated in FIG. 10 and the flexible display device according to the comparative example illustrated in FIG. 11 are deformable and fixable.

The following describes the deformation and fixation of the flexible display device 1 including the support system 100 according to the first embodiment with reference to FIG. 10 through FIG. 12.

FIG. 10 is a partial sectional view of the flexible display device 1 including the support system 100 according to the first embodiment illustrated in FIG. 4, being curved about its curve axis, which is the y-axis direction, and being flat. FIG. 11 is a partial sectional view of a flexible display device 1001 including a support system 1100 in a comparative example, being curved about its curve axis, which is the y-axis direction, and being flat. The support system 1100 in the comparative example is configured the same as the support system 100 illustrated in FIG. 4 with the exception that the support system 1100 does not include the plurality of rigid bodies 140. It is noted that for simple illustration, the application electrodes 130 and the control circuit 150 are omitted.

FIG. 12 schematically illustrates viscosity ranges within which the flexible display device 1 according to the first embodiment illustrated in FIG. 10 and the flexible display device 1001 according to the comparative example illustrated in FIG. 11 are deformable and fixable.

As earlier described in the first embodiment, when the ER fluid 120 is softened, the rigid-body sections 115, corresponding to the rigid bodies 140, of the container 110 is difficult to deform, whereas the flexible sections 116, not corresponding to the rigid bodies 140, of the same are easily deformable. Consequently, when the ER fluid 120 is softened, each rigid-body section 115 does not become deformed, whereas each flexible section 116 becomes deformed, as illustrated in FIG. 10, and the flexible display device 1 thus becomes deformed.

As such, whether the container 110 (i.e., the flexible display device 1) according to the first embodiment is deformable or fixable depends on whether each flexible section 116 is deformable or difficult to deform.

In contrast to this, the support system 1100 in the comparative example does not include the plurality of rigid bodies 140. Consequently, when the ER fluid 120 is softened, the entire container 110 becomes deformed, as illustrated in FIG. 11, and the flexible display device 1001 thus becomes deformed.

For comparisons made among bags with different interior volumetric capacities and with the same fluid sealed therein, under the same conditions, it is known that a bag with a smaller interior volumetric capacity tends to be difficult to deform. As such, the rigid-body sections 115 of the container 110 according to the first embodiment tend to be more difficult to deform than the entire container 110 according to the comparative example.

For the reason described above, as illustrated in FIG. 12, the upper limit of the viscosity of the ER fluid 120 at which the flexible display device 1 according to the first embodiment is easily deformable is smaller than the upper limit of the viscosity of the ER fluid 120 at which the flexible display device 1001 according to the comparative example is easily deformable. Likewise, the lower limit of the viscosity of the ER fluid 120 at which the flexible display device 1 according to the first embodiment is fixable is smaller than the lower limit of the viscosity of the ER fluid 120 at which the flexible display device 1001 according to the comparative example is fixable.

Thus, the configuration (see FIG. 10) according to the first embodiment can offer an effect, i.e., reducing the viscosity of the ER fluid 120 that is necessary for the support system 100 to fix a supported target, such as the flexible display panel 2, when compared with the configuration (see FIG. 11) according to the comparative example, where no rigid bodies 140 are provided. To be specific, the support system 1100 according to the comparative example cannot support the flexible display panel 2 in a fixed manner in a viscosity range C (see FIG. 12), whereas the support system 100 according to the first embodiment can support the flexible display panel 2 in a fixed manner in this range.

This is beneficial for reducing the power consumption of the support system 100 according to the first embodiment in view of the following two conditions. The first one is that the viscosity of the ER fluid 120 typically increases along with increase in applied voltage. The second one is that during the user's use of the flexible display device 1, the time during which the support system 100 supports the flexible display panel 2 in a fixed manner is normally longer than the time during which the support system 100 supports the flexible display panel 2 in a deformable manner.

Arrangement Pattern of Application Electrodes

The following describes various suitable arrangement patterns of the application electrodes 130 with reference to FIG. 13 through FIG. 17. FIG. 13 to FIG. 17 are each a sectional view and a plan view of an example suitable arrangement pattern of the application electrodes 130 according to the first embodiment. It is noted that for simple illustration, the first flexible substrate 111 and second flexible substrate 112 of the container 110 as well as the ER fluid 120 and application electrodes 130 are illustrated, and the other components are omitted.

Figure 13:
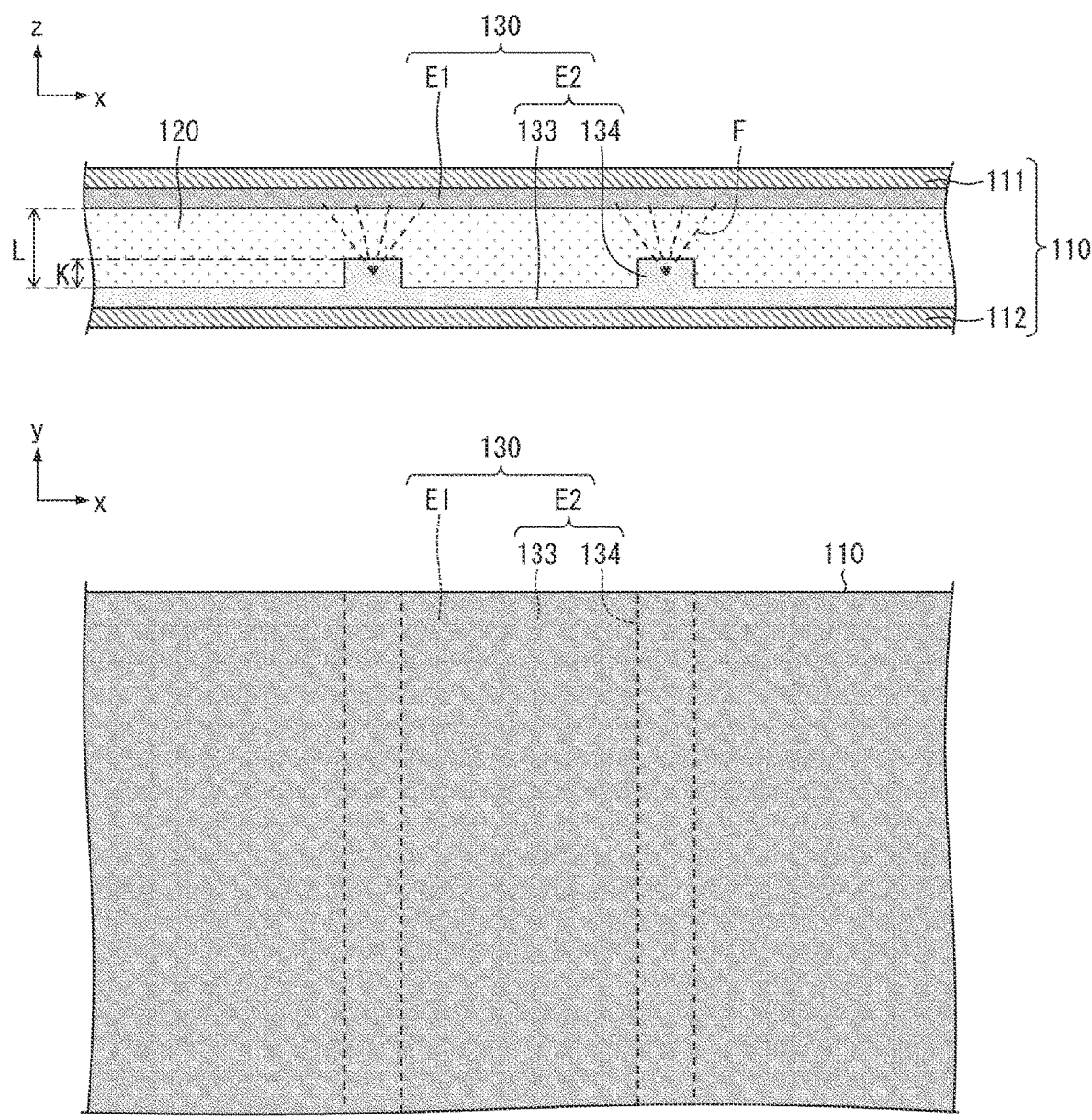
FIG. 13 is a sectional view and a plan view of an example suitable arrangement pattern of application electrodes according to the embodiment of the disclosure.

As illustrated in FIG. 13, the application electrodes 130 are preferably arranged in such a pattern that a first electrode E1 is provided on the first flexible substrate 111, and that a second electrode E2 is provided on the second flexible substrate 112. Here, the second electrode E2 faces the first electrode E1, has a polarity opposite to the polarity of the first electrode E1 and includes the following: a flat part 133; and one or more protrusion parts 134 protruding so as to be closer to the first electrode E1 than the flat part 133 is.

The protrusion parts 134 are adjacent to each other in the x-axis direction (first direction) parallel with the first flexible substrate 111 and each extend in the y-axis direction, as illustrated in FIG. 13 by way of example. This arrangement pattern of the protrusion parts 134 is non-limiting.

In the arrangement pattern illustrated in FIG. 13, the arrangement of the fine particles within the ER fluid 120 at the time when the ER fluid 120 becomes hardened forms concentrated structures F where, as denoted by broken lines in FIG. 13, the fine particles concentrate on the protrusion parts 134. In a conventional technique on the other hand, one of the anode and cathode is merely provided on the first flexible substrate 111, and the other is merely provided on the second flexible substrate 112; thus, no protrusion part is provided in either of the anode and cathode. No concentrated structure F is hence formed in the conventional technique. The arrangement pattern illustrated in FIG. 13 with these concentrated structures F enables the ER fluid 120 to more strongly resist an external force by which the container 110 is bent than the conventional technique.

The protrusion parts 134 of the second electrode E2 are formed so as to be spaced from the first electrode E1, that is, so as not to establish a short circuit between the second electrode E2 and first electrode E1. Further, the protrusion parts 134 preferably do not overlap the rigid bodies 140 in plan view from the z-axis direction. This is because that the concentrated structures F are preferably positioned in the flexible sections 116.

The height, K, of the protrusion parts 134 is the distance in the z-axis direction from the upper surface of the flat part 133 to the upper surface of the protrusion parts 134. For instance, when the distance, L, between the first electrode E1 and the flat part 133 of the second electrode E2 stands at 1 to 50 μm inclusive, the height K preferably stands at 0.05 to 47.5 μm inclusive and preferably stands at 5 to 95% inclusive of the distance L.

It is noted that although not shown, additional protrusion parts 134 may be provided optionally in any one or more of the first electrode E1 and a third electrode E3 through a twelfth electrode E12, which are illustrated in FIG. 14 to FIG. 17 and will be described later on. The concentrated structures F generated by the additional protrusion parts 134 enable the ER fluid 120 to further strongly resist an external force by which the container 110 is bent.

Figure 14:
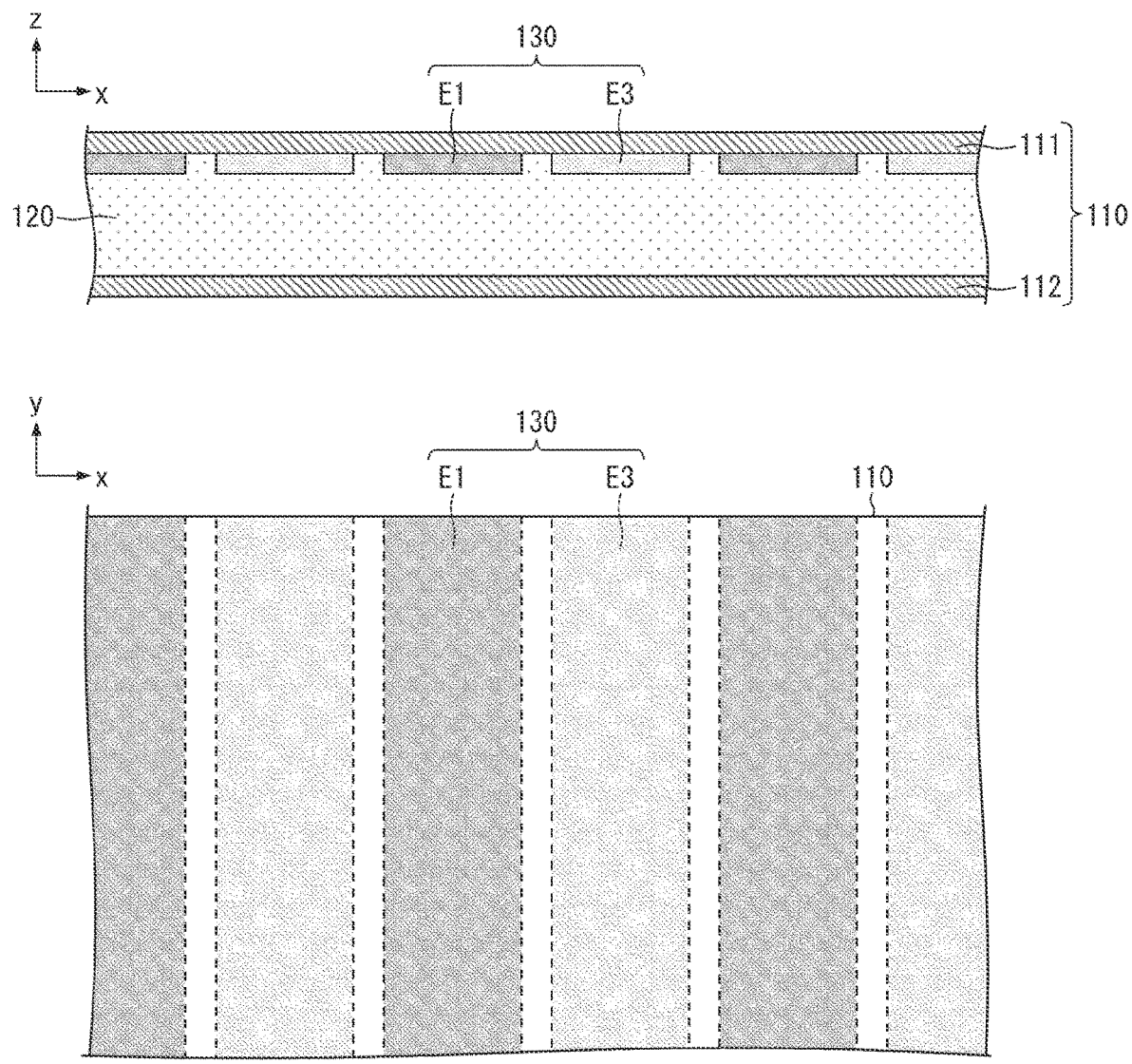
FIG. 14 is a sectional view and a plan view of an example suitable arrangement pattern of the application electrodes according to the embodiment of the disclosure.

As illustrated in FIG. 14, the application electrodes 130 are preferably arranged in such a pattern that the first electrode E1 and the third electrode E3 are provided on only the first flexible substrate 111, and it is more desirable that this arrangement pattern be repeated. Here, the third electrode E3 is adjacent to the first electrode E1 in the x-axis direction (first direction) parallel with the first flexible substrate 111 and has a polarity opposite to the polarity of the first electrode E1.

The fine particles within the ER fluid 120 are arranged along an electric field between the first electrode E1 and third electrode E3 when the ER fluid 120 becomes hardened. In the arrangement pattern illustrated in FIG. 14, the fine particles within the ER fluid 120 are arranged in the x-axis direction when the ER fluid 120 becomes hardened. In the conventional technique on the other hand, one of the anode and cathode is provided on the first flexible substrate 111, and the other is provided on the second flexible substrate 112; thus, the fine particles within the ER fluid 120 are arranged in the z-axis direction when the ER fluid 120 becomes hardened. The arrangement pattern illustrated in FIG. 14 can thus establish more strong resistance against a stress in the x-axis direction than the conventional technique. A stress in the x-axis direction occurs in the ER fluid 120 when the container 110 bends about the y-axis. The arrangement pattern illustrated in FIG. 14 thus enables the ER fluid 120 to more strongly resist an external force by which the container 110 is bent about the y-axis than the conventional technique. It is noted that this holds true for an instance of bringing the container 110 bent about the y-axis back into a flat state.

The arrangement pattern illustrated in FIG. 14 involves a higher electric-field density near the first flexible substrate 111 than near the second flexible substrate 112. The ER fluid 120, which has a viscosity that, as earlier described, increases along with increase in applied voltage, can resist a stress strongly. The ER fluid 120 near the first flexible substrate 111 can thus more strongly resist a stress that is about to bend or develop the flexible display device 1 than the ER fluid 120 near the second flexible substrate 112.

Hence, the support system 100 applying the arrangement pattern illustrated in FIG. 14 is preferably used in such a manner that the second flexible substrate 112 is closer to the stress-neutral plane of the flexible display device 1 than the first flexible substrate 111 is. Here, the stress-neutral plane is in a position where no stress occurs when the flexible display device 1 undergoes bending or development.

Elements, such as quantum-dot light-emitting diodes (QLEDs) and organic light-emitting diodes (OLEDs), that are susceptible to breakage resulting from a stress are often used as subpixels that are provided in the flexible display panel 2. The flexible display panel 2 (its layer including the subpixels) is hence typically disposed in the stress-neutral plane. It is thus preferable that the support system 100 applying the arrangement pattern illustrated in FIG. 14 be normally used in such a manner that the second flexible substrate 112 is closer to the flexible display panel 2. That is, it is preferable that the flexible display panel 2 be firmly fixed to a side adjacent to the second flexible substrate 112 in the support system 100 applying the arrangement pattern illustrated in FIG. 14.

Figure 15:
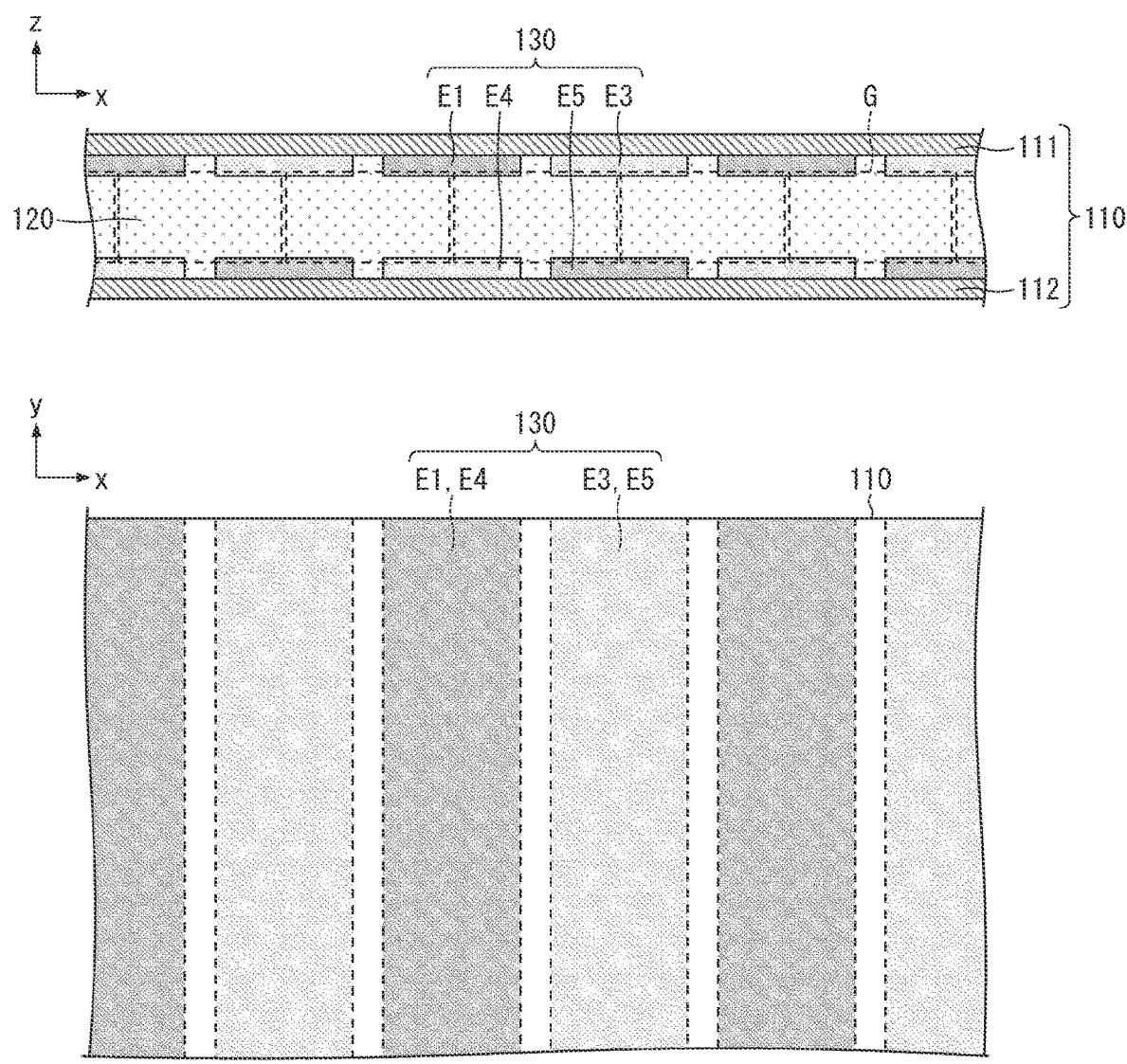
FIG. 15 is a sectional view and a plan view of an example suitable arrangement pattern of the application electrodes according to the embodiment of the disclosure.

As illustrated in FIG. 15, the application electrodes 130 are preferably arranged in such a pattern that the first electrode E1 and the third electrode E3 are provided on the first flexible substrate 111, and that the fourth electrode E4 and the fifth electrode E5 are provided on the second flexible substrate 112, and it is more desirable that this arrangement pattern be repeated. Here, the third electrode E3 is adjacent to the first electrode E1 in the x-axis direction (first direction) parallel with the first flexible substrate 111 and has a polarity opposite to the polarity of the first electrode E1. Further, the fourth electrode E4 faces the first electrode E1 and has a polarity opposite to the polarity of the first electrode E1. Further, the fifth electrode E5 faces the third electrode E3 and has a polarity identical to the polarity of the first electrode E1.

In the arrangement pattern illustrated in FIG. 15, the arrangement of the fine particles within the ER fluid 120 at the time when the ER fluid 120 becomes hardened forms rectangular structures G as denoted by broken lines in FIG. 15. The arrangement pattern illustrated in FIG. with these rectangular structures G enables the ER fluid 120 to more strongly resist an external force by which the container 110 is bent than the arrangement pattern illustrated in FIG. 14.

Figure 16:
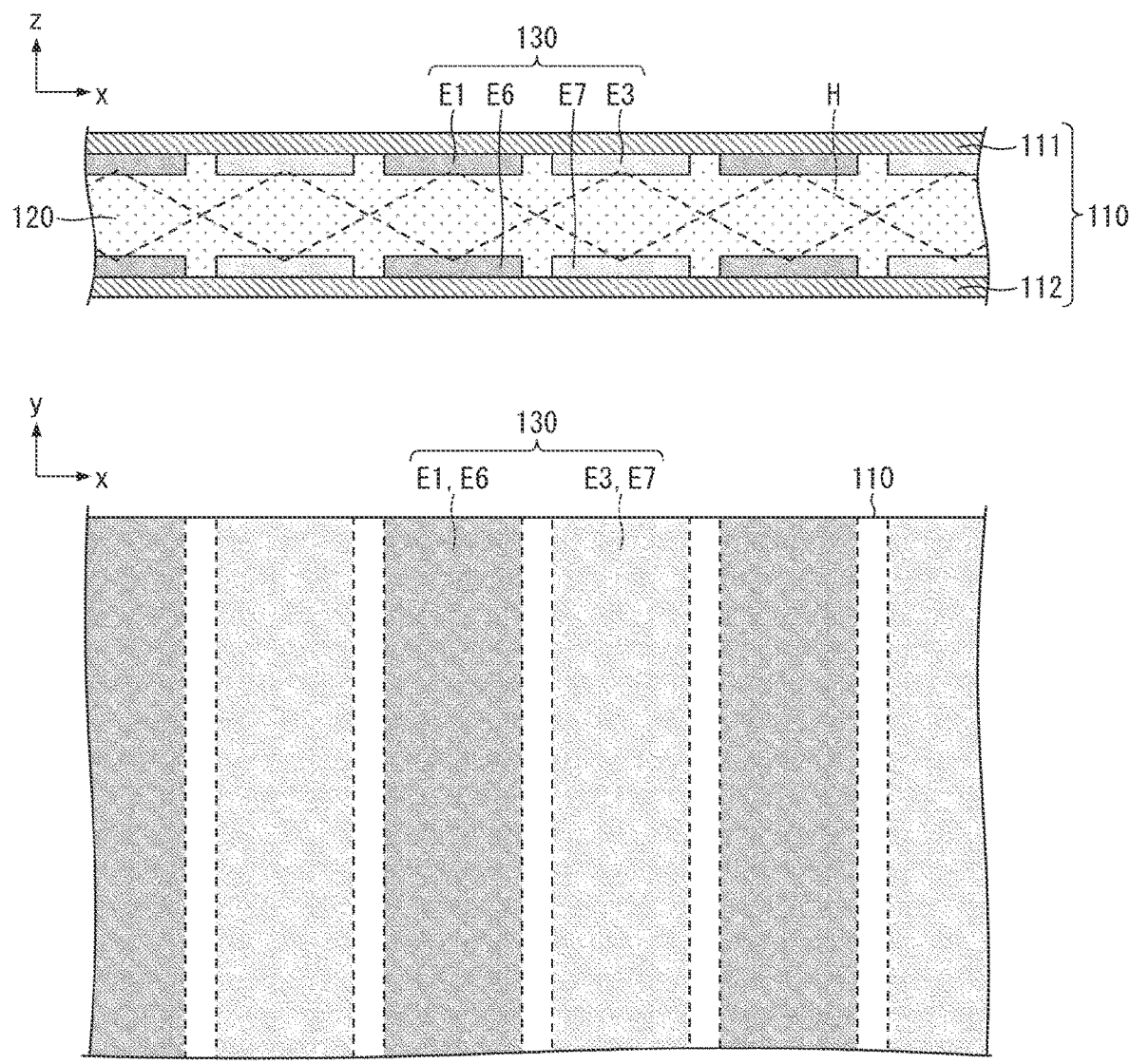
FIG. 16 is a sectional view and a plan view of an example suitable arrangement pattern of the application electrodes according to the embodiment of the disclosure.

As illustrated in FIG. 16, the application electrodes 130 are preferably arranged in such a pattern that the first electrode E1 and the third electrode E3 are provided on the first flexible substrate 111, and that the sixth electrode E6 and the seventh electrode E7 are provided on the second flexible substrate 112, and it is more desirable that this arrangement pattern be repeated. Here, the third electrode E3 is adjacent to the first electrode E1 in the x-axis direction (first direction) parallel with the first flexible substrate 111 and has a polarity opposite to the polarity of the first electrode E1. Further, the sixth electrode E6 faces the first electrode E1 and has a polarity identical to the polarity of the first electrode E1. Further, the seventh electrode E7 faces the third electrode E3 and has a polarity opposite to the polarity of the first electrode E1.

In the arrangement pattern illustrated in FIG. 16, the arrangement of the fine particles within the ER fluid 120 at the time when the ER fluid 120 becomes hardened forms brace structures H as denoted by broken lines in FIG. 16. The arrangement pattern illustrated in FIG. 16 with these brace structures H enables the ER fluid 120 to more strongly resist an external force by which the container 110 is bent than the arrangement pattern illustrated in FIG. 14.

Figure 17:
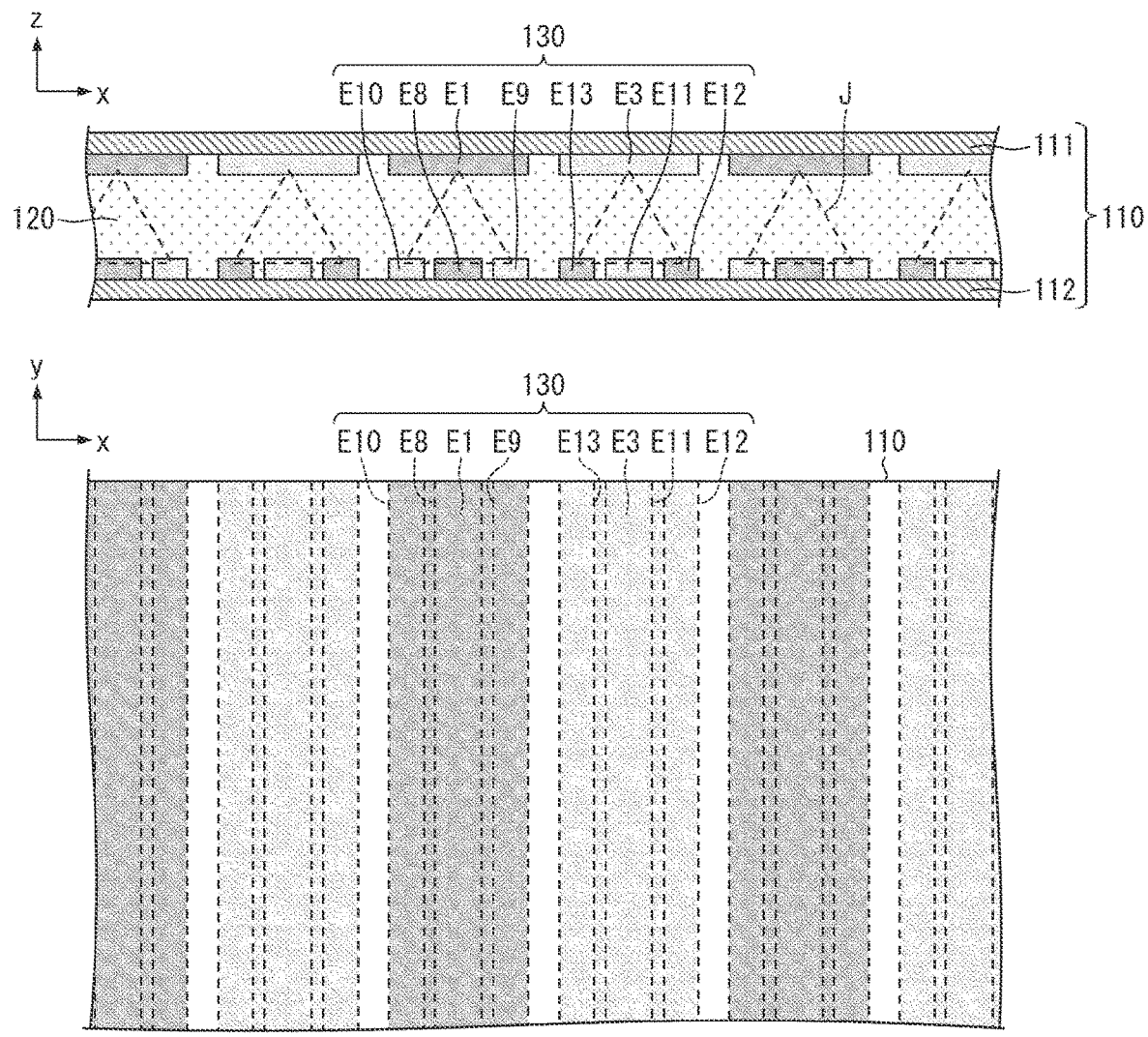
FIG. 17 is a sectional view and a plan view of an example suitable arrangement pattern of the application electrodes according to the embodiment of the disclosure.

As illustrated in FIG. 17, the application electrodes 130 are preferably arranged in such a pattern that the first electrode E1 and the third electrode E3 are provided on the first flexible substrate 111, and that the eighth electrode E8 through the twelfth electrode E12 are provided on the second flexible substrate 112, and it is more desirable that this arrangement pattern be repeated. Here, the third electrode E3 is adjacent to the first electrode E1 in the x-axis direction (first direction) parallel with the first flexible substrate 111 and has a polarity opposite to the polarity of the first electrode E1. Further, the eighth electrode E8 faces the middle of the first electrode E1 in the x-axis direction and has a polarity identical to the polarity of the first electrode E1. Further, the ninth electrode E9 faces one end of the first electrode E1 in the x-axis direction and has a polarity opposite to the polarity of the first electrode E1. Further, the tenth electrode E10 faces the other end of the first electrode E1 in the x-axis direction and has a polarity opposite to the polarity of the first electrode E1. The eleventh electrode E11 faces the middle of the second electrode E2 in the x-axis direction and has a polarity opposite to the polarity of the first electrode E1. Further, the twelfth electrode E12 faces one end of the third electrode E3 in the x-axis direction and has a polarity identical to the polarity of the first electrode E1. Further, the thirteenth electrode E13 faces the other end of the third electrode E3 in the x-axis direction and has a polarity identical to the polarity of the first electrode E1.

In the arrangement pattern illustrated in FIG. 17, the arrangement of the fine particles within the ER fluid 120 at the time when the ER fluid 120 becomes hardened forms torus structures J as denoted by broken lines in FIG. 17. The arrangement pattern illustrated in FIG. 17 with these torus structures J enables the ER fluid 120 to more strongly resist an external force by which the container 110 is bent than the arrangement pattern illustrated in FIG. 14.

The arrangement pattern illustrated in FIG. 17 also involves a higher electric-field density near the second flexible substrate 112 than near the first flexible substrate 111. Hence, the support system 100 applying the arrangement pattern illustrated in FIG. 17 is preferably used in such a manner that the first flexible substrate 111 is closer to the stress-neutral plane of the flexible display device 1 (normally, closer to the flexible display panel 2) than the second flexible substrate 112 is. That is, it is preferable that the flexible display panel 2 be firmly fixed to a side adjacent to the first flexible substrate 111 in the support system 100 applying the arrangement pattern illustrated in FIG. 17.

The first electrode E1 and the third electrode E3 through the seventh electrode E7, illustrated in FIG. 14 to FIG. 17, preferably have a width (size in the x-axis direction) of 20 to 100 μm inclusive. The eighth electrode E8 through the thirteenth electrode E13, illustrated in FIG. 17, preferably have a width (size in the x-axis direction) of 5 to 30 μm inclusive and preferably stands at 25 to 30% inclusive of the width of the first electrode E1 when the width of the first electrode E1 stands at 20 to 100 μm.

The rigid bodies 140 are preferably disposed so as to be adjacent to each other in the x-axis direction, as illustrated in FIG. 5, when the application electrodes 130 are disposed as illustrated in FIG. 14 to FIG. 17. This combination enables the rigid bodies 140 to support the container 110 in the y-axis direction in a fixed manner and enables the application electrodes 130 to support the container 110 in the x-axis direction in a fixed or deformable manner.

Driving Waveform

Figure 18:
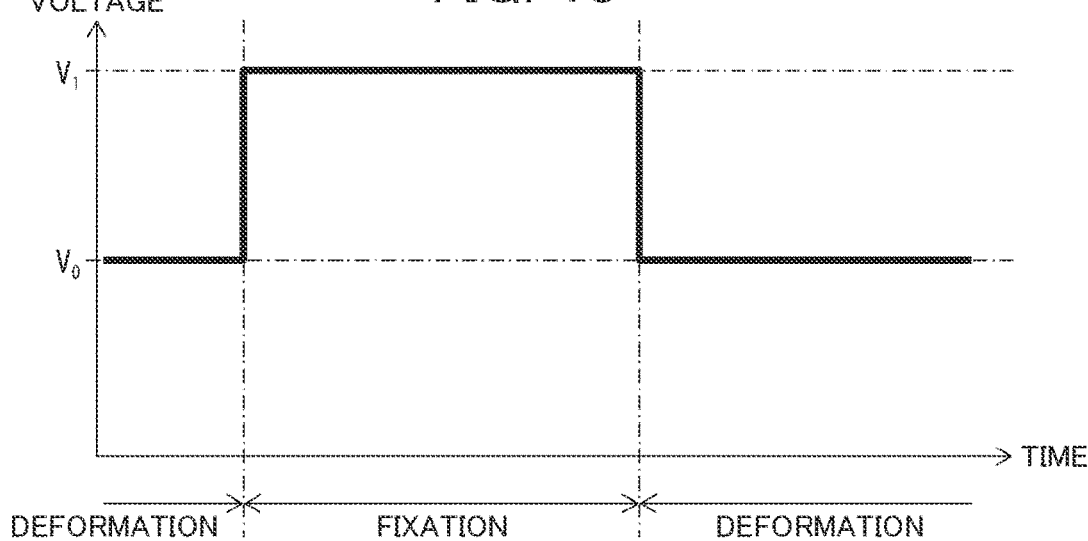
FIG. 18 illustrates the waveform of driving voltage that is output to application electrodes 130 illustrated in FIG. 4.

The following describes the waveform of driving voltage for driving the support system 100 according to the first embodiment with reference to FIG. 18.

FIG. 18 illustrates the waveform of driving voltage that is output from the power source circuit 151 to the application electrodes 130 under the control of the control circuit 150. $V_0$ is the voltage at the time of softening the ER fluid 120 and typically stands at 0 V. $V_1$ is the voltage at the time of hardening the ER fluid 120 and typically stands at 5 to 15 V inclusive.

Such a driving waveform can be achieved by, as illustrated in FIG. 4 by way of example, connecting the power source circuit 151 to the application electrodes 130 via a transistor 152, and connecting the control circuit 150 to the gate electrode of the transistor 152. The transistor 152 preferably falls under an enhancement type. This is because that an enhancement type can easily shut off the voltage supply from the power source circuit 151 to the application electrodes 130 when the ER fluid 120 undergoes softening.

Modifications

Figure 19:
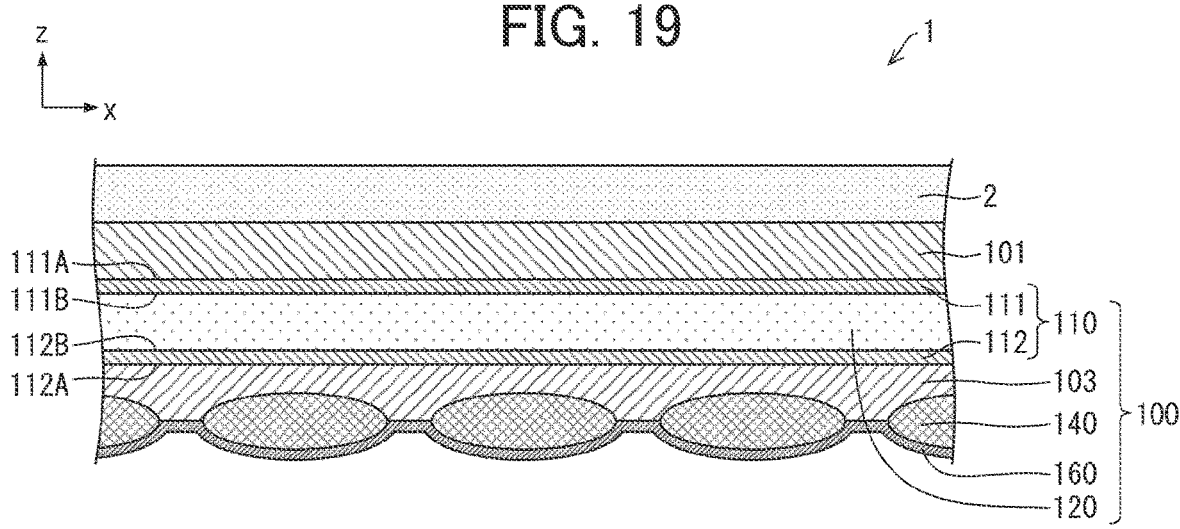
FIG. 19 is a sectional view of the schematic configuration of the flexible display device according to a modification of the embodiment of the disclosure.
Figure 20:
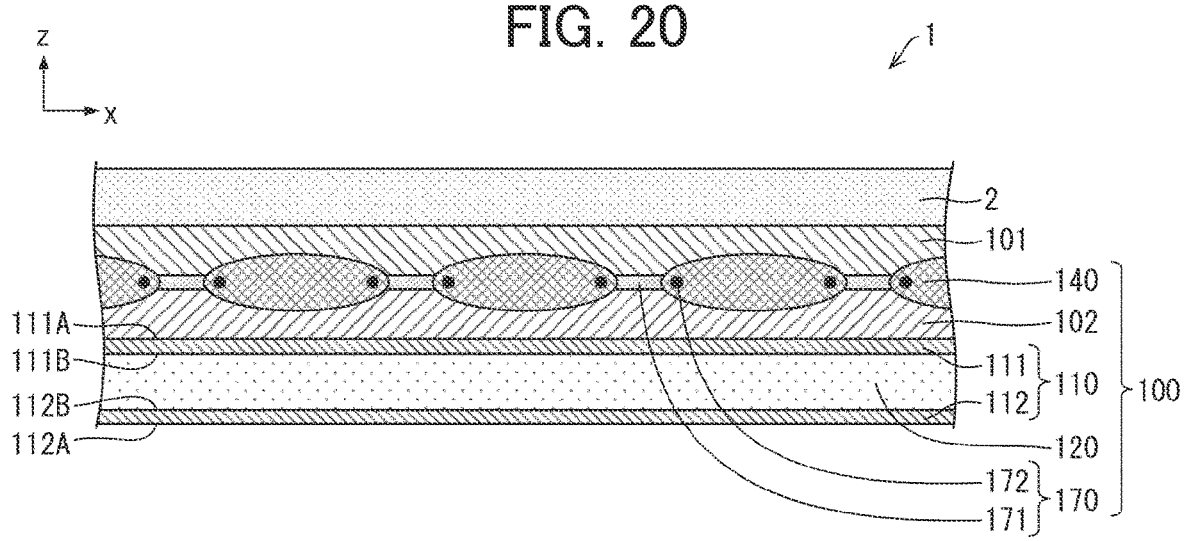
FIG. 20 is a sectional view of the schematic configuration of the flexible display device according to a modification of the embodiment of the disclosure.
Figure 21:
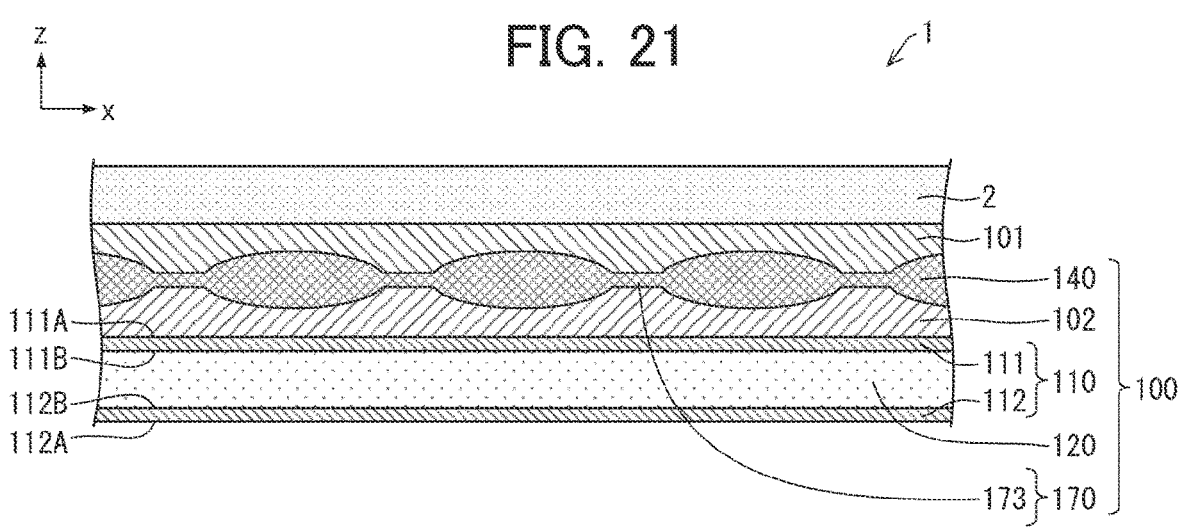
FIG. 21 is a sectional view of the schematic configuration of the flexible display device according to a modification of the embodiment of the disclosure.

The following describes the flexible display device 1 according to various modifications of the first embodiment with reference to FIG. 19 through FIG. 21. FIG. 19 to FIG. 21 are each a sectional view of the schematic configuration of the flexible display device 1 according to the various modifications of the first embodiment. It is noted that for simple illustration, the application electrodes 130 and the control circuit 150 are omitted.

As illustrated in FIG. 19, the plurality of rigid bodies 140 may be each firmly fixed to the outer surface 12A of the second flexible substrate 112 flexibly via the third adhesive layer 103. It is noted that in this case, a protective film 160 is preferably attached onto the rigid bodies 140 and third adhesive layer 103 so that the third adhesive layer 103 is not exposed to the outside of the flexible display device 1.

Further, although not shown, some of the plurality of rigid bodies 140 may be each firmly fixed to the outer surface 111A of the first flexible substrate 111, and others of them may be each firmly fixed to the outer surface 112A of the second flexible substrate 112.

As illustrated in FIG. 20 and FIG. 21, the plurality of rigid bodies 140 may be coupled to each other through a coupler 170 Such coupling enables the plurality of rigid bodies 140 to be disposed with respect to each other in advance before fixing the plurality of rigid bodies 140 firmly to the container 110. This can improve work efficiency and work precision in fixing the plurality of rigid bodies 140 firmly to the container 110.

The coupler 170 may be a rotatable coupler for instance and may include, as illustrated in FIG. 21, arms 171 and pins 172 connecting the arms 171 rotatably to the rigid bodies 140. The coupler 170 like this hinders a relative movement between the rigid bodies 140 by the static friction between the parts of the coupler 170 (e.g., between the arm 171 and pin 172), and by the static friction between the coupler 170 and the rigid bodies 140.

The coupler 170 may be a plastically deformable coupler for instance and may include, as illustrated in FIG. 21, plastically deformable parts 173. The coupler 170 like this hinders a plastic deformation of the coupler 170 by deformation resistance and thus hinders a relative movement between the rigid bodies 140. Further in this case, the rigid bodies 140 and the coupler 170 may be formed at the same time using the same material by changing the material's thickness.

As described above, the coupler 170 can inhibit a relative movement between the rigid bodies 140. This can further reduce the viscosity of the ER fluid 120 that is necessary for the support system 100 according to the first embodiment to fix the flexible display panel 2.

Second Embodiment

The following describes another embodiment of the disclosure. It is noted that for convenience in description, components having the same functions as the components described in the foregoing embodiment will be denoted by the same signs, and that their description will not be repeated.

The flexible display device 1 illustrated in FIG. 1 may include a support system 200 according to a second embodiment instead of the foregoing support system 100 according to the first embodiment.

Configuration of Support System

Figure 22:
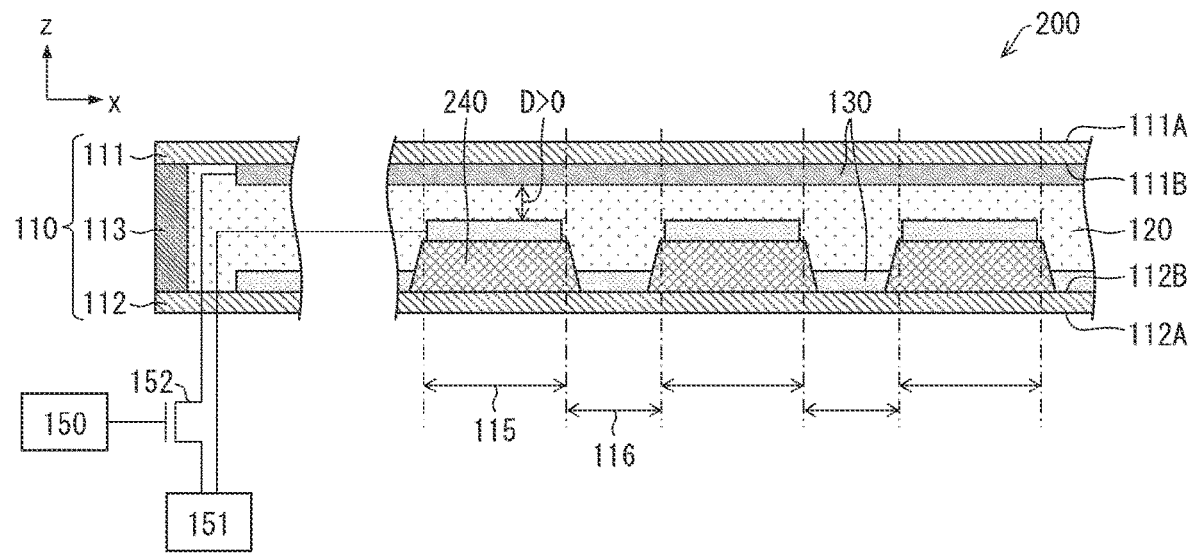
FIG. 22 is a sectional view of an example schematic configuration of a support system according to another embodiment of the disclosure.
Figure 23:
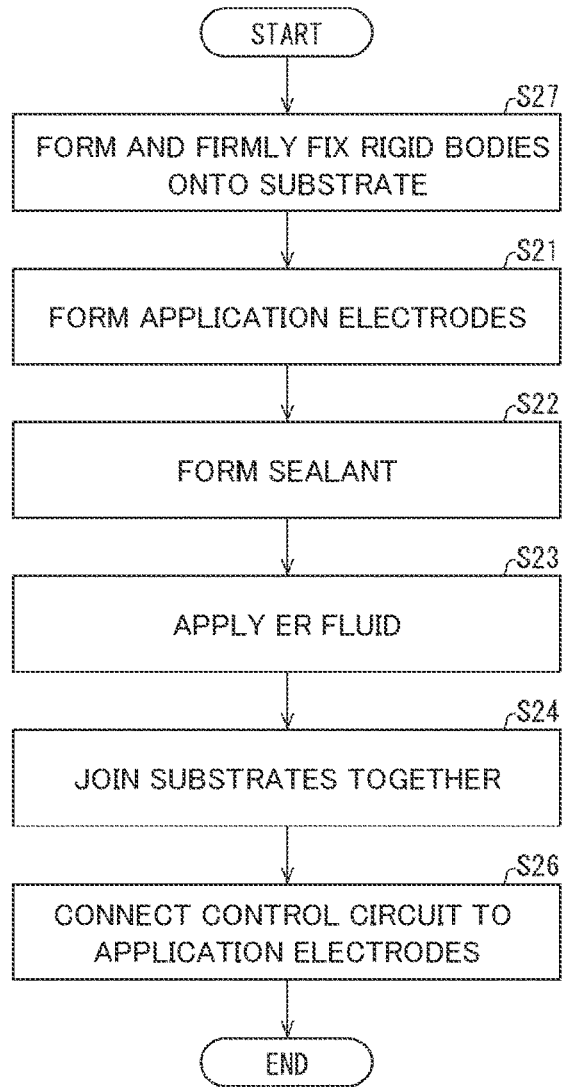
FIG. 23 is a flowchart schematically showing an example method for manufacturing the support system illustrated in FIG. 22.
Figure 24:
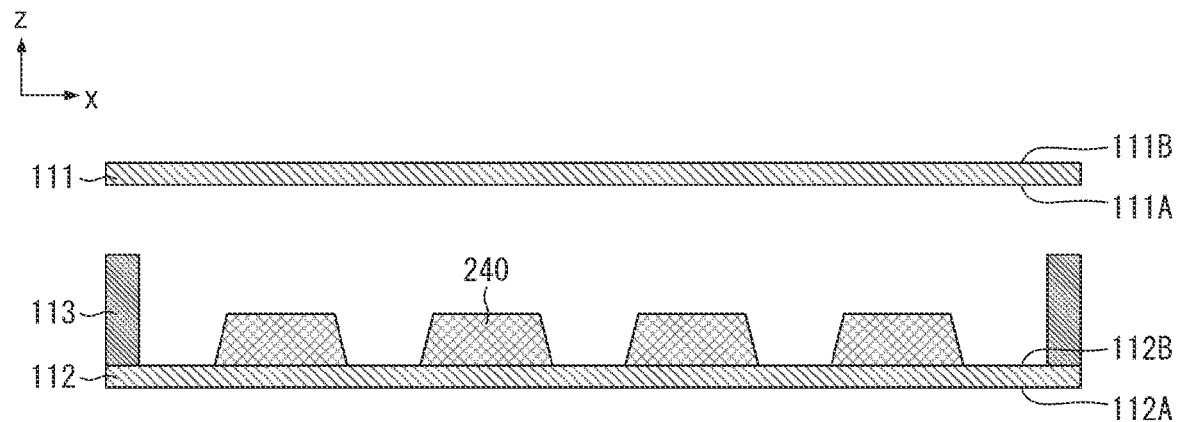
FIG. 24 schematically illustrates, in sectional view, an example process step for manufacturing the support system illustrated in FIG. 22.

The following describes the configuration of the support system 200 according to the second embodiment with reference to FIG. 22 through FIG. 24.

FIG. 22 is a sectional view of an example schematic configuration of the support system 200 according to the second embodiment.

As illustrated in FIG. 22, the support system 200 according to the second embodiment is configured the same as the support system 100 according to the first embodiment with the exception that the support system 200 includes, instead of the rigid bodies 140, rigid bodies 240 each firmly fixed to the inner surface 112B (one inner surface of the container) of the second flexible substrate 112, and that the support system 200 includes no second adhesive layer 102. Thus, the configuration according to the second embodiment can reduce the thickness of the support system 200 (i.e., the size in the z-axis direction) by at least the thickness of the second adhesive layer 102 further than the configuration according to the first embodiment.

The plurality of rigid bodies 240 take any sectional shape; they may be in the form of mutually different shapes. The plurality of rigid bodies 240 may be formed of an insulating material, such as resin, or may be formed of a conductive material, such as metal. When the rigid bodies 240 are formed of a material exhibiting a polarization characteristic, the application electrodes 130 may be provided between the second flexible substrate 112 and the rigid bodies 240. When the rigid bodies 240 are formed of a conductive material, the rigid bodies 240 may function as the application electrodes 130. The plurality of rigid bodies 240 take any arrangement pattern.

Method for Manufacturing Support System

Figure 25:
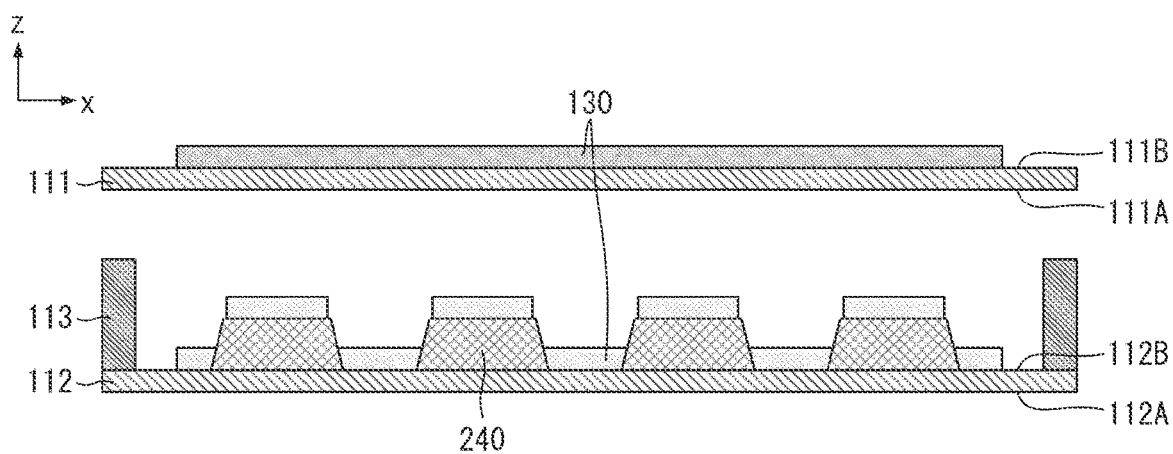
FIG. 25 schematically illustrates, in sectional view, an example process step for manufacturing the support system illustrated in FIG. 22.

The following describes a method for manufacturing the support system 200 according to the second embodiment with reference to FIG. 23 through FIG. 25.

FIG. 23 is a flowchart schematically showing an example method for manufacturing the support system 200 illustrated in FIG. 22. FIG. 24 and FIG. 25 each schematically illustrate, in sectional view, an example process step for manufacturing the support system 200 illustrated in FIG. 22.

The first process step is preparing the first flexible substrate 111 and the second flexible substrate 112, and placing them in such a manner that their inner surfaces 111B and 112B are pointed upward. The next (Step S27) is, as illustrated in FIG. 23 and FIG. 24, forming the plurality of rigid bodies 240 onto the inner surface 112B of the second flexible substrate 112. These rigid bodies 240 are each firmly fixed to the inner surface 112B.

The next (Step S21) is, as illustrated in FIG. 23 and FIG. 25, forming the application electrodes 130 and wires (not shown) as appropriate onto the inner surfaces 111B and 112B of the first flexible substrate 111 and second flexible substrate 112 and onto the upper surfaces of the plurality of rigid bodies 240. Thereafter, Steps S22 through S24 are performed like those in the first embodiment, followed by Step S26, as illustrated in FIG. 23.

Deformation and Fixation of Flexible Display Device

Figure 26:
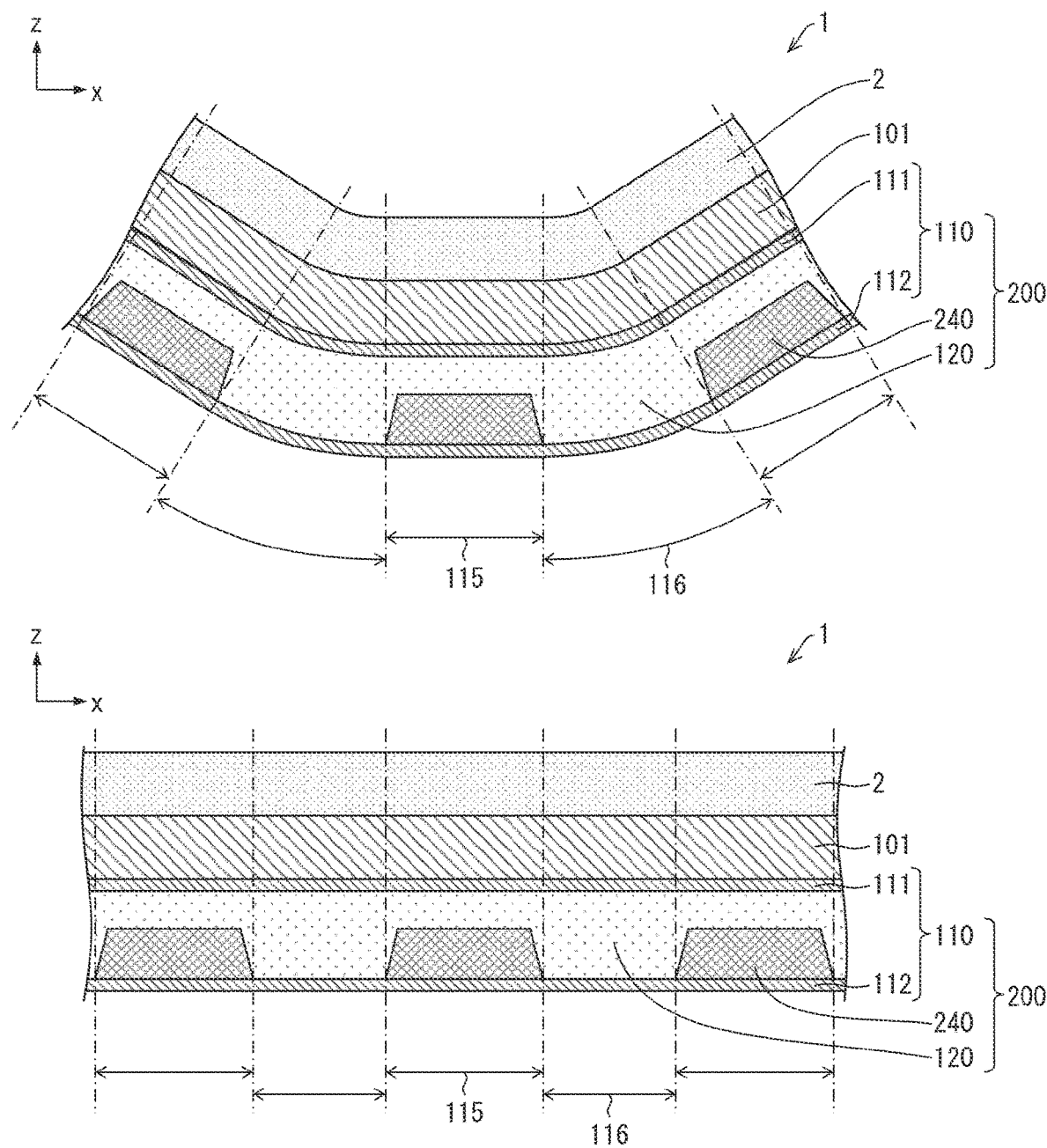
FIG. 26 is a partial sectional view of a flexible display device including the support system, 200, illustrated in FIG. 22, being curved about its curve axis, which is the y-axis direction.

The following describes the deformation and fixation of the flexible display device 1 including the support system 200 according to the second embodiment with reference to FIG. 26.

FIG. 26 is a partial sectional view of the flexible display device 1 including the support system 200 according to the second embodiment illustrated in FIG. 22, being curved about its curve axis, which is the y-axis direction. It is noted that for simple illustration, the application electrodes 130 and the control circuit 150 are omitted.

Like that in the first embodiment, in the second embodiment, when the ER fluid 120 is softened, each rigid-body section 115 does not become deformed, whereas each flexible section 116 becomes deformed, as illustrated in FIG. 26, and the flexible display device 1 thus becomes deformed. Thus, the configuration (see FIG. 26) according to the second embodiment can offer an effect, i.e., reducing the viscosity of the ER fluid 120 that is necessary for the support system 200 to fix the flexible display panel 2, when compared with a configuration according to a comparative example (not shown) where no rigid bodies 240 are provided.

Modifications

Figure 27:
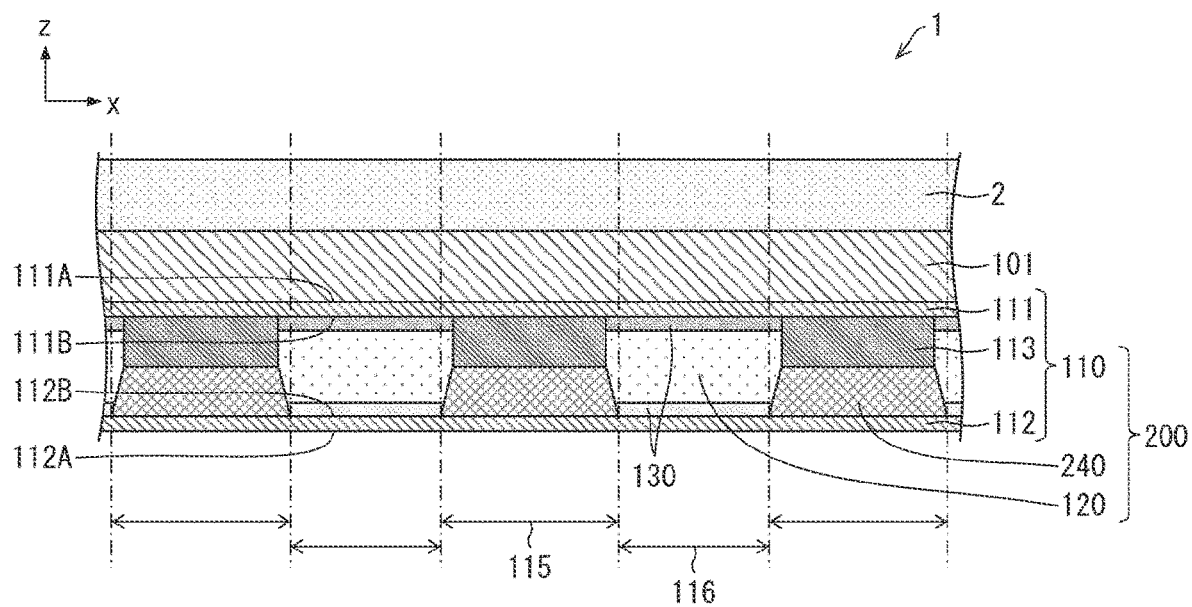
FIG. 27 is a sectional view of the schematic configuration of the flexible display device according to a modification of the embodiment of the disclosure.
Figure 28:
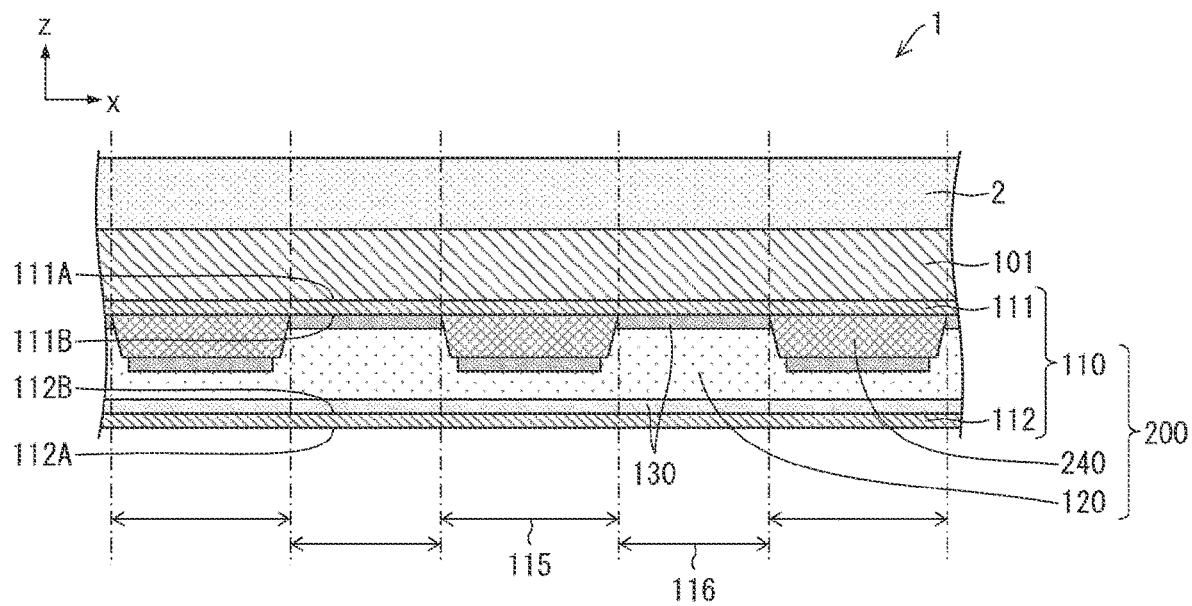
FIG. 28 is a sectional view of the schematic configuration of the flexible display device according to a modification of the embodiment of the disclosure.

The following describes the flexible display device 1 according to various modifications of the second embodiment with reference to FIG. 27 and FIG. 28. It is noted that for simple illustration, the control circuit 150 is omitted. FIG. 27 and FIG. 28 are each a sectional view of the schematic configuration of the flexible display device 1 according to the various modifications of the second embodiment.

As illustrated in FIG. 27, the plurality of rigid bodies 240 may be each firmly fixed also to the inner surface 111B (the other inner surface of the container facing the one inner surface) of the first flexible substrate 111 with the sealant 113. That is, the plurality of rigid bodies 240 may be each firmly fixed to both of the inner surfaces 111B and 112B of the first flexible substrate 111 and second flexible substrate 112. In this case, no ER fluid 120 is in the rigid-body sections 115; thus, the application electrodes 130 may be provided in only the flexible sections 116.

The configuration illustrated in FIG. 27 can reduce the total area of the application electrodes 130, and the amount of the ER fluid 120 and can thus reduce manufacture costs. This configuration, which includes the first flexible substrate 111 and second flexible substrate 112 joined to each other in the plurality of rigid bodies 240 as well as on the perimeter, provides the container 110 with high structural stability. Further, the ER fluid 120 is sealed independently for each flexible section 116 when the plurality of rigid bodies 240 are disposed as illustrated in FIG. 5. Consequently, even if the ER fluid 120 leaks from one or some of the flexible sections 116, the other flexible sections 116 can retain the ER fluid 120. This can improve the reliability of the support system 200.

In the configuration illustrated in FIG. 27, to avoid a breakage of the display device 1, the bendable range of the display device 1 is preferably limited, and/or the first adhesive layer 101 and the sealant 113 are preferably flexible. This is because that the ER fluid 120 does not change volume substantially.

It is noted that although not shown, the application electrodes 130 may be provided in only the flexible sections 116 even when the minimum distance between the upper surface of each rigid body 240 and the inner surface 111B of the first flexible substrate 111 is so small that the ER fluid 120 becomes softened or is difficult to flow in the rigid-body sections 115.

As illustrated in FIG. 28, the plurality of rigid bodies 240 may be each formed on the inner surface 111B of the first flexible substrate 111. Further, although not shown, some of the plurality of rigid bodies 240 may be formed on the inner surface 111B of the first flexible substrate 111, and others of them may be formed on the inner surface 112B of the second flexible substrate 112. Further, although not shown, the plurality of rigid bodies 240 may be, in part or in whole, formed on the outer surface 111A of the first flexible substrate 111 or on the outer surface 112A of the second flexible substrate 112.

It is noted that like those in the foregoing support system 100 according to the first embodiment, the application electrodes 130 in the support system 200 according to the second embodiment take any arrangement pattern and suitably take the arrangement patterns illustrated in FIG. 13 to FIG. 17.

Third Embodiment

The following describes another embodiment of the disclosure. It is noted that for convenience in description, components having the same functions as the components described in the foregoing embodiments will be denoted by the same signs, and that their description will not be repeated.

The flexible display device 1 illustrated in FIG. 1 may include a support system 300 according to a third embodiment instead of the foregoing support system 100 or 200 according to the first or second embodiment.

Configuration of Support System

Figure 29:
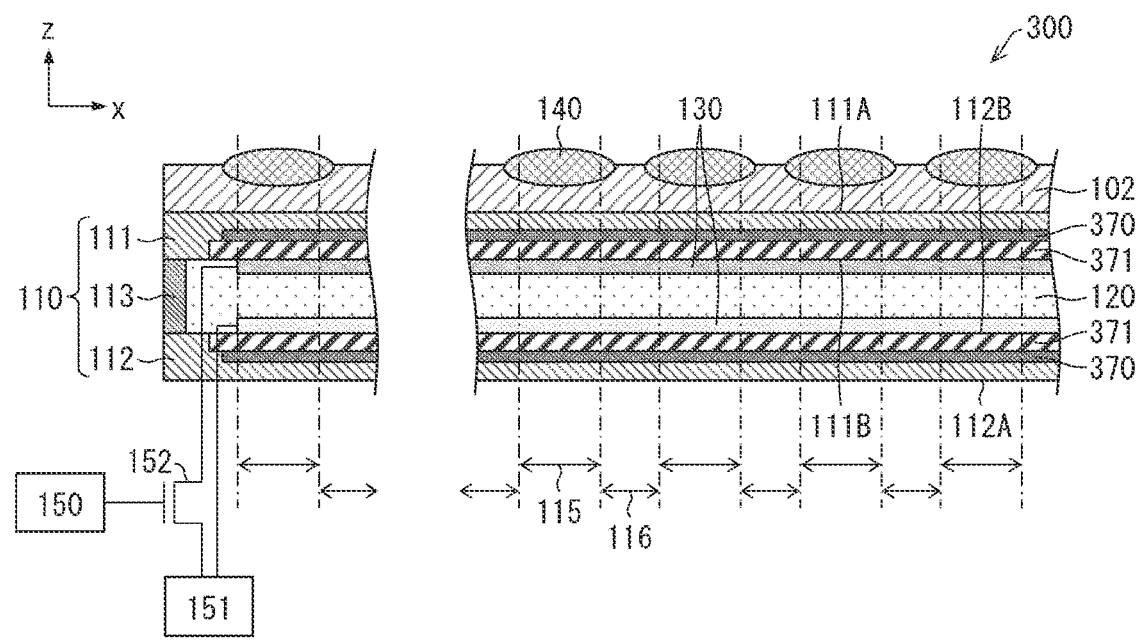
FIG. 29 is a sectional view of an example schematic configuration of a support system according to further another embodiment of the disclosure.
Figure 30:
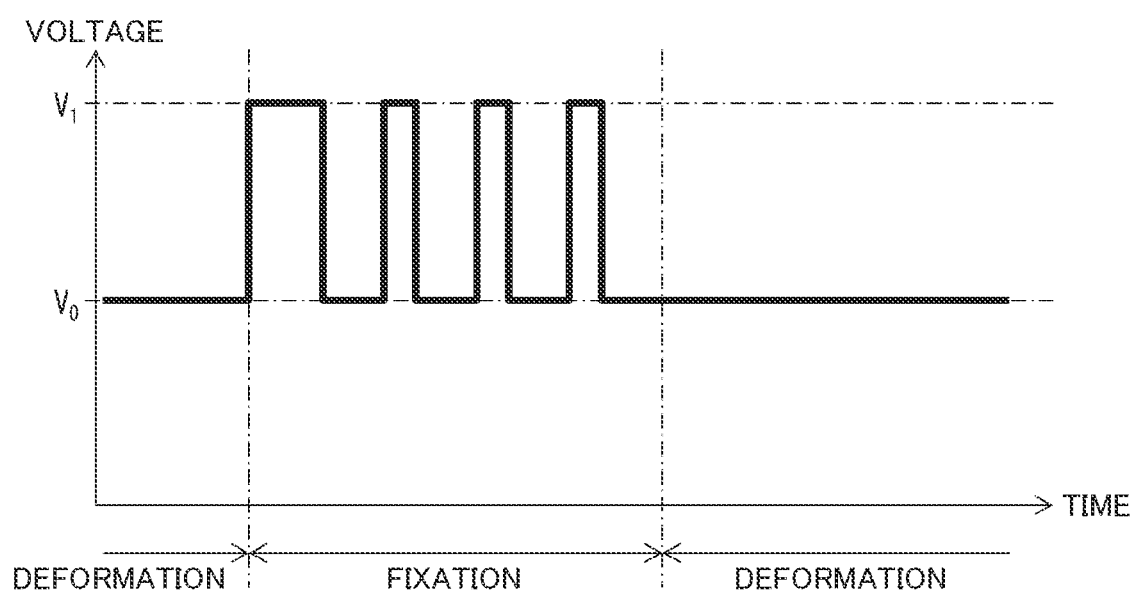
FIG. 30 illustrates the waveform of driving voltage that is output to the application electrodes 130 illustrated in FIG. 29.

The following describes the configuration of the support system 300 according to the third embodiment with reference to FIG. 29 and FIG. 30.

FIG. 29 is a sectional view of an example schematic configuration of the support system 300 according to the third embodiment. FIG. 30 illustrates the waveform of driving voltage that is output from the power source circuit 151 to the application electrodes 130 under the control of the control circuit 150 illustrated in FIG. 29.

As illustrated in FIG. 29, the support system 300 according to the third embodiment is configured the same as the foregoing support system 100 according to the first embodiment with the exception that the support system 300 additionally includes retention electrodes 370 and insulating layers 371.

The retention electrodes 370 are floating electrodes and are provided, as appropriate, on the first flexible substrate 111 and/or the second flexible substrate 1112 so as to sandwich the insulating layers 371 between the application electrodes 130 (first electrodes) and the retention electrodes 370. The retention electrode 370 within the first flexible substrate 111 is provided opposite the second flexible substrate 112 with respect to the application electrode 130 (i.e., near the outer surface 111A) so as not to hinder the voltage application from the application electrode 130 to the ER fluid 120. Likewise, the retention electrode 370 within the second flexible substrate 112 is provided opposite the first flexible substrate 111 with respect to the application electrode 130 (i.e., near the outer surface 112A) so as not to hinder the voltage application from the application electrode 130 to the ER fluid 120.

The voltage of the application electrodes 130 is difficult to vary by this retention capacity. Accordingly, as illustrated in FIG. 30, the control circuit 150 may supply voltage to the application electrodes 130 so as to sufficiently charge the application electrodes 130 when the ER fluid 120 starts to become hardened, and the control circuit 150 may periodically supply voltage to the application electrodes 130 while the ER fluid 120 is hardened.

Furthermore, although not shown, a discharge circuit may be provided for reducing the voltage of the application electrodes 130 rapidly when the ER fluid 120 starts to become softened.

It is noted that the retention electrodes 370 can be provided for the application electrodes 130 of any arrangement pattern. It is also noted that the retention electrodes 370 can be provided additionally in the support system 200 according to the second embodiment.

Summary

A support system according to a first aspect of the disclosure includes the following: a container that is deformable; an electrorheological fluid sealed in the container; and a plurality of application electrodes each provided in the container, and the support system further includes a plurality of rigid bodies each firmly fixed to the container.

The support system according to a second aspect of the disclosure may be configured, in the first aspect, such that the plurality of rigid bodies are disposed so as not to overlap each other in a plan view.

The support system according to a third aspect of the disclosure may be configured, in the first or second aspect, such that the plurality of rigid bodies are each firmly fixed to one outer surface of the container.

The support system according to a fourth aspect of the disclosure may be configured, in the third aspect, such that the plurality of rigid bodies are coupled together via a rotatable coupler.

The support system according to a fifth aspect of the disclosure may be configured, in the third aspect, such that the plurality of rigid bodies are coupled together via a plastically deformable coupler.

The support system according to a sixth aspect of the disclosure may be configured, in the first or second aspect, such that the plurality of rigid bodies are each firmly fixed to one inner surface of the container.

The support system according to a seventh aspect of the disclosure may be configured, in the sixth aspect, such that the plurality of rigid bodies are each further fixed firmly to the other inner surface of the container facing the one inner surface.

The support system according to an eighth aspect of the disclosure may, in any one of the first to seventh aspects, further include a control circuit configured to soften or harden the electrorheological fluid by controlling a current that is supplied to each of the plurality of application electrodes, wherein the electrorheological fluid softened by the control circuit has a viscosity at which the container is deformable, and the electrorheological fluid hardened by the control circuit has a viscosity at which the container is fixable.

The support system according to a ninth aspect of the disclosure may be configured, in any one of the first to eighth aspects, such that the container contains a first flexible substrate and a second flexible substrate facing the first flexible substrate, such that the electrorheological fluid is sealed between the first flexible substrate and the second flexible substrate, such that the plurality of application electrodes include a first electrode provided on the first flexible substrate, and a second electrode provided on the second flexible substrate, facing the first electrode, and having a polarity opposite to the polarity of the first electrode, and such that the second electrode has a flat part, and a protrusion part protruding so as to be closer to the first electrode than the flat part is.

The support system according to a tenth aspect of the disclosure may be configured, in the ninth aspect, such that the protrusion part of the second electrode is spaced from the first electrode.

The support system according to an eleventh aspect of the disclosure may be configured, in the ninth or tenth aspect, such that the protrusion part of the second electrode is provided so as not to overlap the plurality of rigid bodies in a plan view.

The support system according to a twelfth aspect of the disclosure may be configured, in any one of the first to eighth aspects, such that the container contains a first flexible substrate and a second flexible substrate facing the first flexible substrate, such that the electrorheological fluid is sealed between the first flexible substrate and the second flexible substrate, and such that the plurality of application electrodes include a first electrode provided on the first flexible substrate, and a third electrode provided on the first flexible substrate, being adjacent to the first electrode in a first direction parallel with the first flexible substrate, and having a polarity opposite to the polarity of the first electrode.

A support system according to a thirteenth aspect of the disclosure is may be configured, in the twelfth aspect, such that the plurality of application electrodes are provided on only the first flexible substrate.

The support system according to a fourteenth aspect of the disclosure may be configured, in the twelfth aspect, such that the plurality of application electrodes further include a fourth electrode provided on the second flexible substrate, facing the first electrode, and having a polarity opposite to the polarity of the first electrode, and a fifth electrode provided on the second flexible substrate, facing the third electrode, and having a polarity identical to the polarity of the first electrode.

The support system according to a fifteenth aspect of the disclosure may be configured, in the twelfth aspect, such that the plurality of application electrodes further include a sixth electrode provided on the second flexible substrate, facing the first electrode, and having a polarity identical to the polarity of the first electrode, and a seventh electrode provided on the second flexible substrate, facing the third electrode, and having a polarity opposite to the polarity of the first electrode.

The support system according to a sixteenth aspect of the disclosure may be configured, in the twelfth aspect, such that the plurality of application electrodes further include an eighth electrode provided on the second flexible substrate, facing the middle of the first electrode in the first direction, and having a polarity identical to the polarity of the first electrode, a ninth electrode provided on the second flexible substrate, facing one end of the first electrode in the first direction, and having a polarity opposite to the polarity of the first electrode, and a tenth electrode provided on the second flexible substrate, facing the other end of the first electrode in the first direction, and having a polarity opposite to the polarity of the first electrode.

The support system according to a seventeenth aspect of the disclosure may be configured, in any one of the twelfth to sixteenth aspects, such that the plurality of rigid bodies are disposed so as to be adjacent to each other in the first direction.

The support system according to an eighteenth aspect of the disclosure may, in any one of the ninth to seventeenth aspects, further includes a retention electrode and an insulating layer provided on the first flexible substrate, wherein the retention electrode is positioned opposite the second flexible substrate with respect to the first electrode, and the insulating layer is positioned between the first electrode and the retention electrode.

The support system according to a nineteenth aspect of the disclosure may be configured, in any one of the first to eighteenth aspects, such that the electrorheological fluid has a viscosity that increases along with increase in an applied voltage.

The support system according to a twentieth aspect of the disclosure may be configured, in any one of the first to nineteenth aspects, such that the electrorheological fluid is composed of an electrical insulating fluid, and fine particles exhibiting a polarization characteristic.

A flexible display device according to a twenty-first aspect of the disclosure includes the following: the support system according to any one of the first to twentieth aspects; and a flexible display panel firmly fixed to the support system.

A flexible display device according to a twenty-second aspect of the disclosure may include the following: the support system according to the thirteenth aspect; and a flexible display panel firmly fixed to a side of the support system adjacent to the second flexible substrate.

A flexible display device according to a twenty-third aspect of the disclosure may include the following: the support system according to the sixteenth aspect; and a flexible display panel firmly fixed to a side of the support system adjacent to the first flexible substrate.

The flexible display device according to a twenty-fourth aspect of the disclosure may be configured, in the flexible display device recited in the twenty-second or twenty-third aspect, such that the plurality of rigid bodies are disposed so as to be adjacent to each other in the first direction.

The flexible display device according to a twenty-fifth aspect of the disclosure may, in the flexible display device recited in any one of the twenty-second to twenty-fourth aspects, further include a retention electrode and an insulating layer provided on the first flexible substrate, wherein the retention electrode is positioned opposite the second flexible substrate with respect to the first electrode, and the insulating layer is positioned between the first electrode and the retention electrode.

The flexible display device according to a twenty-sixth aspect of the disclosure may be configured, in the flexible display device recited in any one of the twenty-second to twenty-fifth aspects, such that the electrorheological fluid has a viscosity that increases along with increase in an applied voltage.

The flexible display device according to a twenty-seventh aspect of the disclosure may be configured, in the flexible display device recited in the twenty-sixth aspect, such that the electrorheological fluid is composed of an electrical insulating fluid, and fine particles exhibiting a polarization characteristic.

The disclosure is not limited to the foregoing embodiments. Various modifications can be devised within the scope of the claims. An embodiment that is obtained in combination, as appropriate, with the technical means disclosed in the respective embodiments is also included in the technical scope of the disclosure. Furthermore, combining the technical means disclosed in the respective embodiments can form a new technical feature.

The invention claimed is:

1. A support system comprising:
a container that is deformable;
an electrorheological fluid sealed in the container;
a plurality of application electrodes, each provided in the container; and
a plurality of rigid bodies, each firmly fixed to the container,
wherein each of the plurality of rigid bodies is firmly fixed to one outer surface of the container.

2. The support system according to claim 1, wherein the plurality of rigid bodies is disposed so as not to overlap each other in a plan view.

3. The support system according to claim 1, wherein the plurality of rigid bodies is coupled together via a rotatable coupler.

4. The support system according to claim 1, wherein the plurality of rigid bodies is coupled together via a plastically deformable coupler.

5. The support system according to claim 1, further comprising a control circuit configured to soften or harden the electrorheological fluid by controlling a current that is supplied to each of the plurality of application electrodes,
wherein the electrorheological fluid softened by the control circuit has a viscosity at which the container is deformable, and
the electrorheological fluid hardened by the control circuit has a viscosity at which the container is fixable.

6. The support system according to claim 1, wherein
the container contains a first flexible substrate and a second flexible substrate facing the first flexible substrate,
the electrorheological fluid is sealed between the first flexible substrate and the second flexible substrate,
the plurality of application electrodes includes:
a first electrode provided on the first flexible substrate, and
a second electrode provided on the second flexible substrate, facing the first electrode, and having a polarity opposite to a polarity of the first electrode, and
the second electrode has a flat part and a protrusion part protruding so as to be closer to the first electrode than the flat part is.

7. The support system according to claim 6, wherein the protrusion part of the second electrode is spaced from the first electrode.

8. The support system according to claim 6, wherein the protrusion part of the second electrode is provided so as not to overlap the plurality of rigid bodies in a plan view.

9. The support system according to claim 6, further comprising a retention electrode and an insulating layer provided on the first flexible substrate, wherein the retention electrode is positioned opposite the second flexible substrate with respect to the first electrode, and the insulating layer is positioned between the first electrode and the retention electrode.

10. The support system according to claim 1, wherein the container contains a first flexible substrate and a second flexible substrate facing the first flexible substrate, the electrorheological fluid is sealed between the first flexible substrate and the second flexible substrate, and the plurality of application electrodes includes:
 a first electrode provided on the first flexible substrate, and
 a third electrode provided on the first flexible substrate, being adjacent to the first electrode in a first direction parallel with the first flexible substrate, and having a polarity opposite to a polarity of the first electrode.

11. The support system according to claim 10, wherein the plurality of application electrodes is provided on only the first flexible substrate.

12. The support system according to claim 10, wherein the plurality of application electrodes further includes:
 a fourth electrode provided on the second flexible substrate, facing the first electrode, and having a polarity opposite to the polarity of the first electrode, and
 a fifth electrode provided on the second flexible substrate, facing the third electrode, and having a polarity identical to the polarity of the first electrode.

13. The support system according to claim 10, wherein the plurality of application electrodes further includes:
 a sixth electrode provided on the second flexible substrate, facing the first electrode, and having a polarity identical to the polarity of the first electrode, and
 a seventh electrode provided on the second flexible substrate, facing the third electrode, and having a polarity opposite to the polarity of the first electrode.

14. The support system according to claim 10, wherein the plurality of application electrodes further includes:
 an eighth electrode provided on the second flexible substrate, facing a middle of the first electrode in the first direction, and having a polarity identical to the polarity of the first electrode,
 a ninth electrode provided on the second flexible substrate, facing one end of the first electrode in the first direction, and having a polarity opposite to the polarity of the first electrode, and
 a tenth electrode provided on the second flexible substrate, facing another end of the first electrode in the first direction, and having a polarity opposite to the polarity of the first electrode.

15. The support system according to claim 10, wherein the plurality of rigid bodies is disposed so as to be adjacent to each other in the first direction.

16. The support system according to claim 1, wherein the electrorheological fluid has a viscosity that increases along with an increase in an applied voltage.

17. The support system according to claim 1, wherein the electrorheological fluid comprises an electrical insulating fluid, and fine particles exhibiting a polarization characteristic.

18. A support system comprising:
 a container that is deformable;
 an electrorheological fluid sealed in the container;
 a plurality of application electrodes each provided in the container; and
 a plurality of rigid bodies, each firmly fixed to the container, wherein
 the container contains a first flexible substrate and a second flexible substrate facing the first flexible substrate,
 the electrorheological fluid is sealed between the first flexible substrate and the second flexible substrate,
 the plurality of application electrodes includes:
  a first electrode provided on the first flexible substrate, and
  a second electrode provided on the second flexible substrate, facing the first electrode, and having a polarity opposite to a polarity of the first electrode, and
 the second electrode has a flat part and a protrusion part protruding so as to be closer to the first electrode than the flat part is.

19. A support system comprising:
 a container that is deformable;
 an electrorheological fluid sealed in the container;
 a plurality of application electrodes each provided in the container; and
 a plurality of rigid bodies, each firmly fixed to the container, wherein
 the container contains a first flexible substrate and a second flexible substrate facing the first flexible substrate,
 the electrorheological fluid is sealed between the first flexible substrate and the second flexible substrate, and
 the plurality of application electrodes includes:
  a first electrode provided on the first flexible substrate, and
  a third electrode provided on the first flexible substrate, being adjacent to the first electrode in a first direction parallel with the first flexible substrate, and having a polarity opposite to a polarity of the first electrode.

20. The support system according to claim 19, wherein the plurality of rigid bodies is disposed so as not to overlap each other in a plan view.

\* \* \* \* \*